(12) United States Patent
Yoo et al.

(10) Patent No.: US 11,597,150 B2
(45) Date of Patent: Mar. 7, 2023

(54) THREE-DIMENSIONAL PRINTING SYSTEM AND EQUIPMENT ASSEMBLY

(71) Applicant: APRECIA PHARMACEUTICALS LLC, Blue Ash, OH (US)

(72) Inventors: Jaedeok Yoo, Princeton, NJ (US); Thomas J. Bradbury, Yardley, PA (US); Thomas J. Bebb, Pottstown, PA (US); James Iskra, Somerset, PA (US); Henry L. Surprenant, Phoenixville, PA (US); Thomas G. West, Lawrenceville, NJ (US)

(73) Assignee: APRECIA PHARMACEUTICALS LLC, Blue Ash, OH (US)

( * ) Notice: Subject to any disclaimer, the term of this patent is extended or adjusted under 35 U.S.C. 154(b) by 0 days.

(21) Appl. No.: 17/407,911

(22) Filed: Aug. 20, 2021

(65) Prior Publication Data

US 2022/0126517 A1  Apr. 28, 2022

Related U.S. Application Data

(63) Continuation of application No. 16/568,515, filed on Sep. 12, 2019, now Pat. No. 11,097,483, which is a (Continued)

(51) Int. Cl.
*B29C 64/35* (2017.01)
*B33Y 30/00* (2015.01)
(Continued)

(52) U.S. Cl.
CPC .......... *B29C 64/35* (2017.08); *B29C 64/165* (2017.08); *B29C 64/236* (2017.08); (Continued)

(58) Field of Classification Search
CPC ..... B29C 64/35; B29C 64/165; B29C 64/236; B29C 64/245; B29C 64/176; B29C 67/00; B29C 64/209; B29C 64/321; B29C 64/393; B29C 67/04; B33Y 10/00; B33Y 30/00; B33Y 40/00; B33Y 40/20; B33Y 50/02; B29L 2009/00; Y10T 428/24851; B22F 7/02; B41F 23/04
See application file for complete search history.

(56) References Cited

U.S. PATENT DOCUMENTS 10,357,827 B2 * 7/2019 Shaw ................. B22F 12/20
11,141,792 B2 * 10/2021 Wüst .................. B33Y 40/00
(Continued)

*Primary Examiner* — Nahida Sultana
(74) *Attorney, Agent, or Firm* — Daniel F. Nesbitt; Nesbitt IP LLC

(57) ABSTRACT

A three-dimensional printing system and equipment assembly for the manufacture of three-dimensionally printed articles is provided. The equipment assembly includes a three-dimensional printing build system, an optional liquid removal system and an optional harvester system. The build system includes a conveyor, plural build modules and at least one build station having a powder-layering system and a printing system. The equipment assembly can be used to manufacture pharmaceutical, medical, and non-pharmaceutical/non-medical objects. It can be used to prepare single or multiple articles.

6 Claims, 19 Drawing Sheets

Related U.S. Application Data continuation of application No. 15/981,365, filed on May 16, 2018, now Pat. No. 10,449,712, which is a continuation of application No. 15/871,445, filed on Jan. 15, 2018, now Pat. No. 10,118,335, which is a continuation of application No. 15/422,969, filed on Feb. 2, 2017, now Pat. No. 9,908,293, which is a continuation of application No. 15/077,112, filed on Mar. 22, 2016, now Pat. No. 9,517,592, which is a continuation of application No. 15/046,714, filed on Feb. 18, 2016, now Pat. No. 9,517,591, which is a continuation of application No. 14/501,716, filed on Sep. 30, 2014, now Pat. No. 9,610,735, which is a continuation of application No. 14/016,697, filed on Sep. 3, 2013, now Pat. No. 8,888,480, which is a continuation of application No. PCT/US2013/057466, filed on Aug. 30, 2013.

(60) Provisional application No. 61/696,839, filed on Sep. 5, 2012.

(51) Int. Cl.
*B33Y 40/00* (2020.01)
*B33Y 10/00* (2015.01)
*B33Y 50/02* (2015.01)
*B29C 64/245* (2017.01)
*B29C 64/236* (2017.01)
*B29C 64/165* (2017.01)
*B33Y 40/20* (2020.01)
*B29L 9/00* (2006.01)

(52) U.S. Cl.
CPC ............ *B29C 64/245* (2017.08); *B33Y 10/00* (2014.12); *B33Y 30/00* (2014.12); *B33Y 40/00* (2014.12); *B33Y 40/20* (2020.01); *B33Y 50/02* (2014.12); *B29L 2009/00* (2013.01); *Y10T 428/24851* (2015.01)

(56) References Cited

U.S. PATENT DOCUMENTS

| | | | | |
|---|---|---|---|---|
| 11,253,923 | B2* | 2/2022 | Herzog | B33Y 30/00 |
| 2008/0241414 | A1* | 10/2008 | Kim | C09D 11/52 |
| | | | | 427/256 |
| 2009/0025638 | A1* | 1/2009 | Inoue | A61C 13/0013 |
| | | | | 118/712 |
| 2012/0059504 | A1* | 3/2012 | Pax | B33Y 40/10 |
| | | | | 198/339.1 |

* cited by examiner

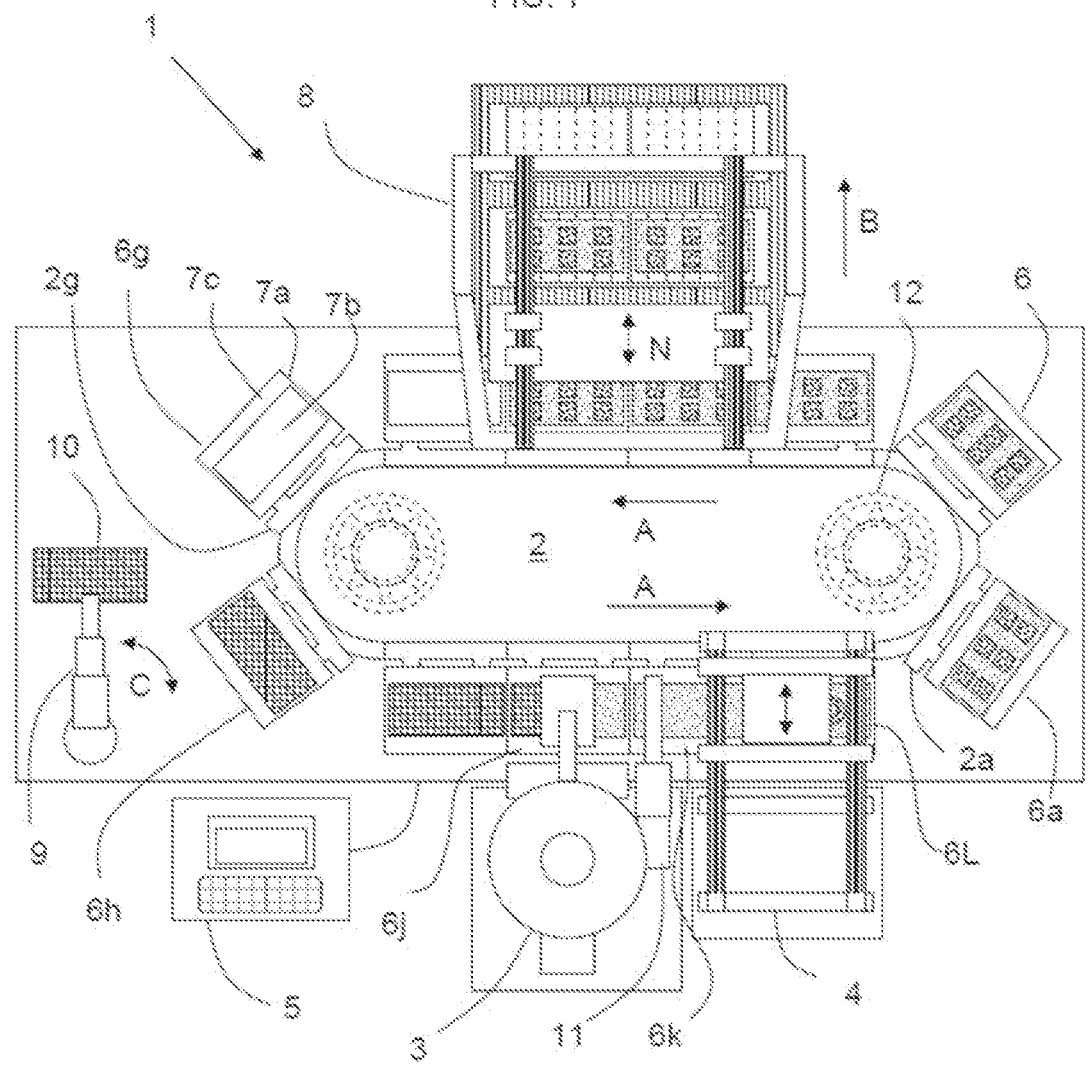

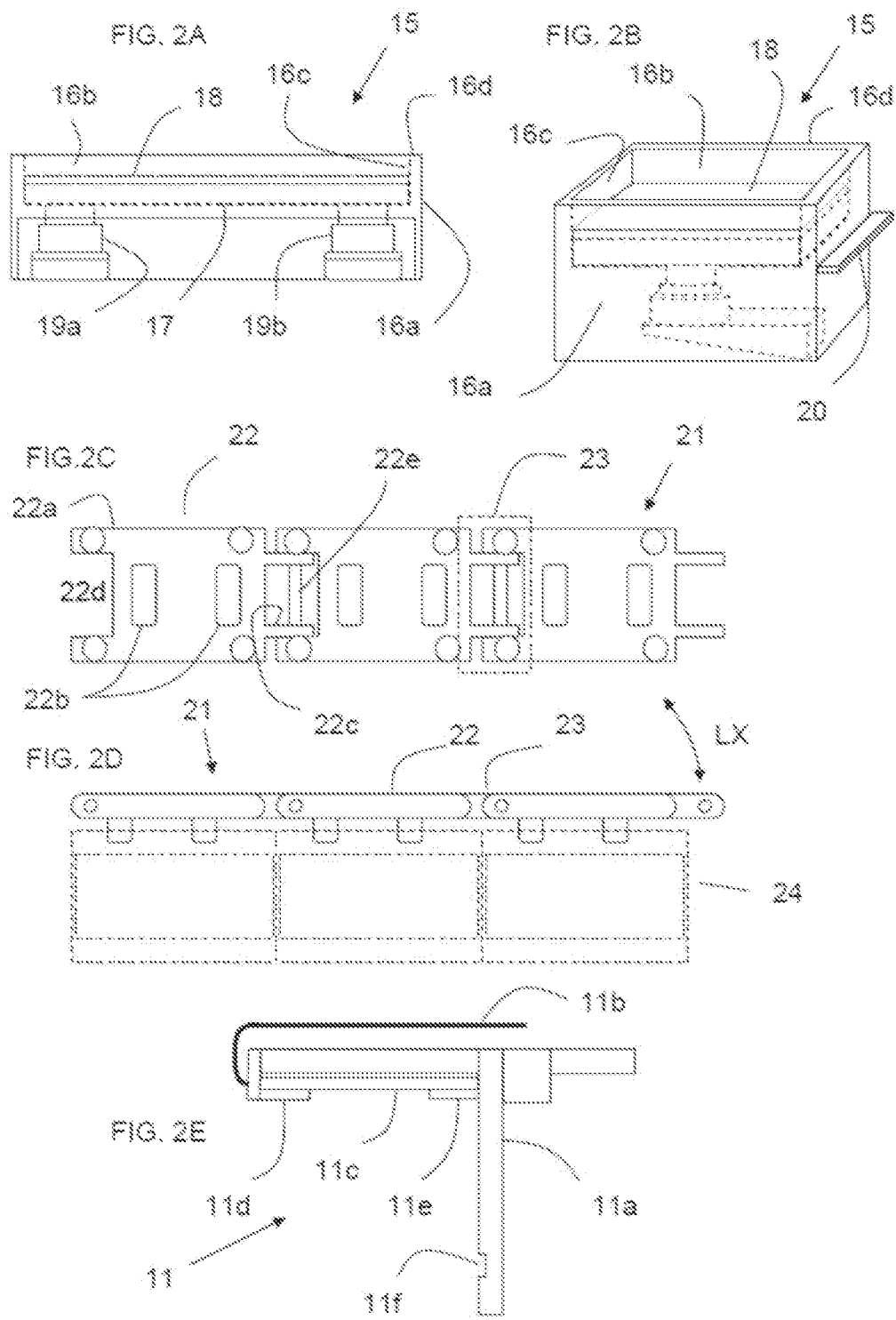

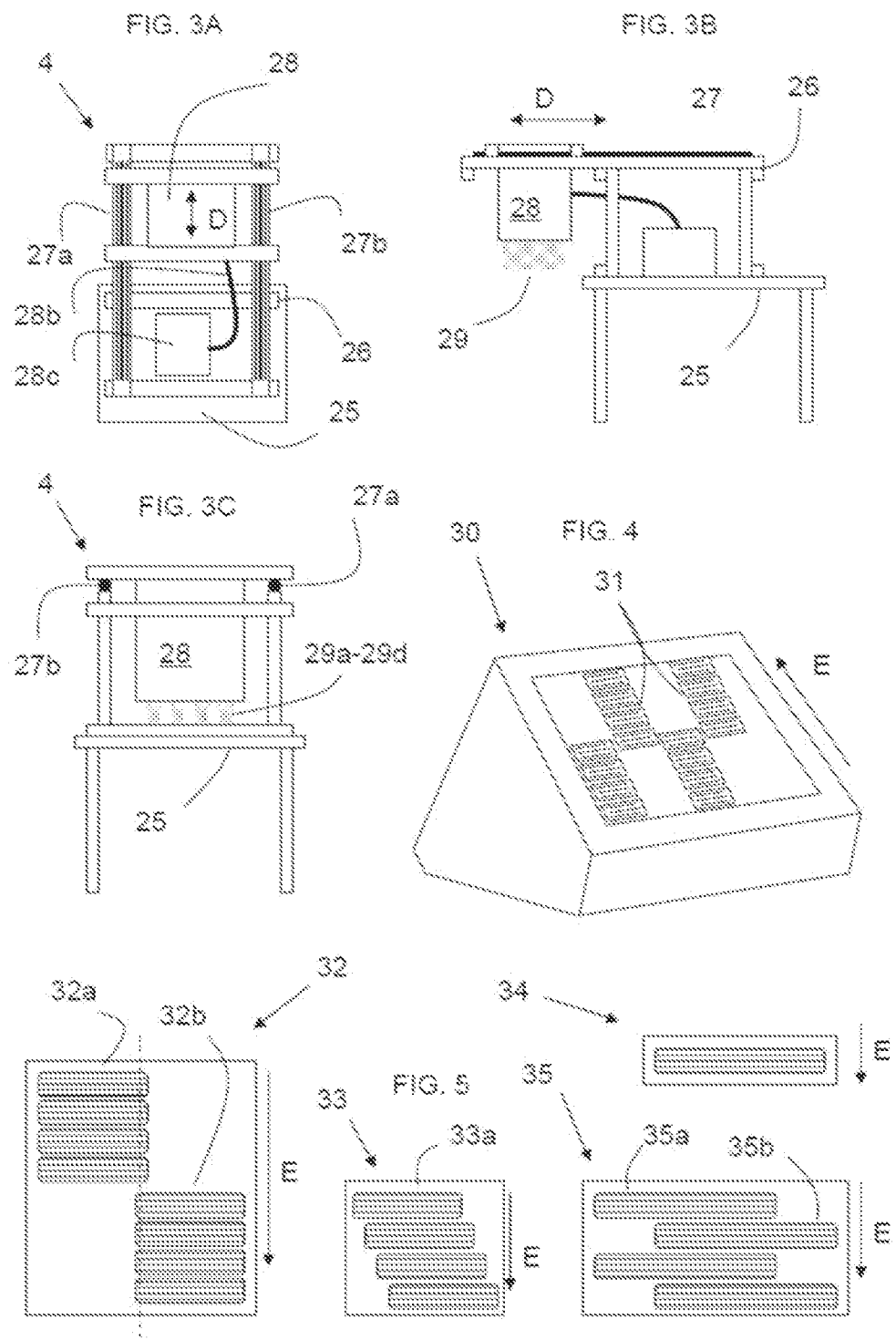

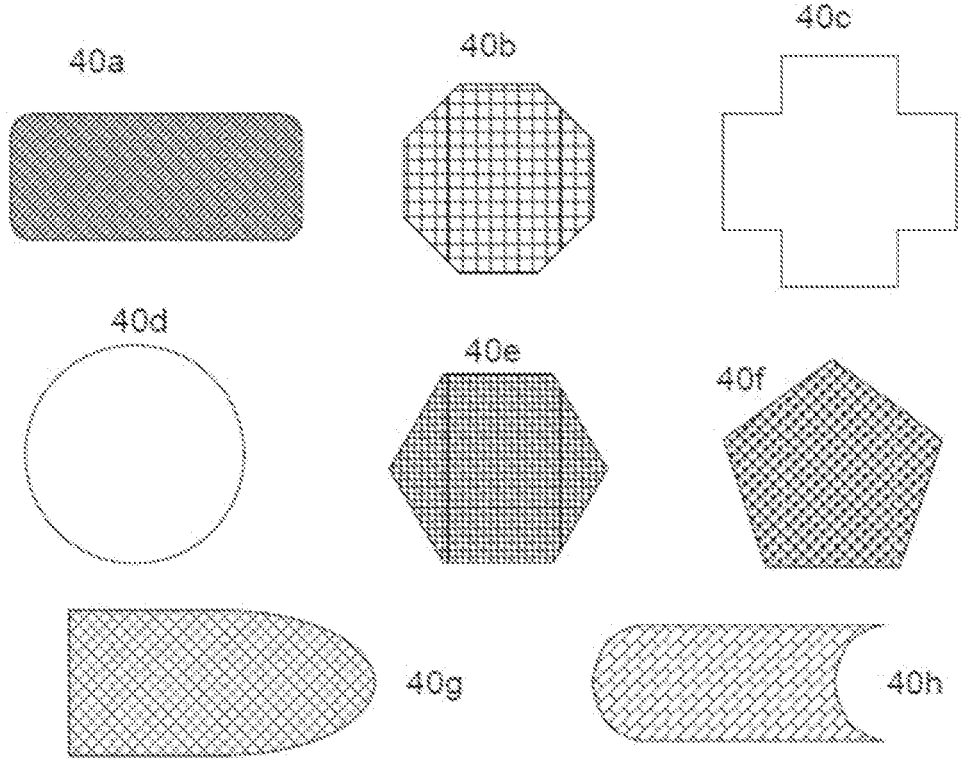
FIG. 6
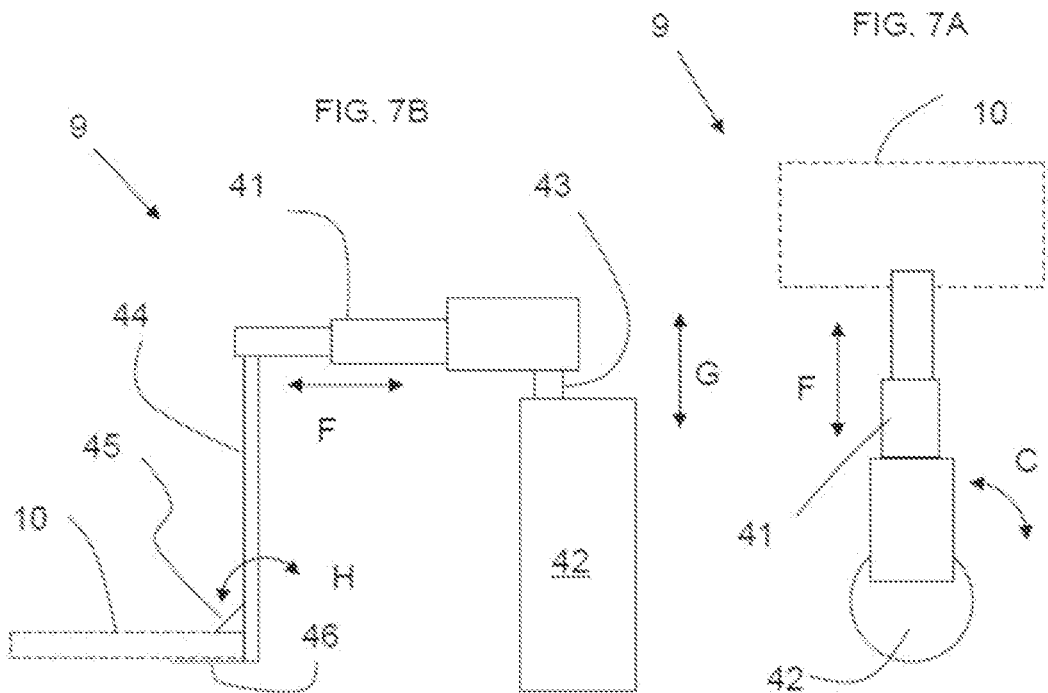
FIG. 7B
FIG. 7A

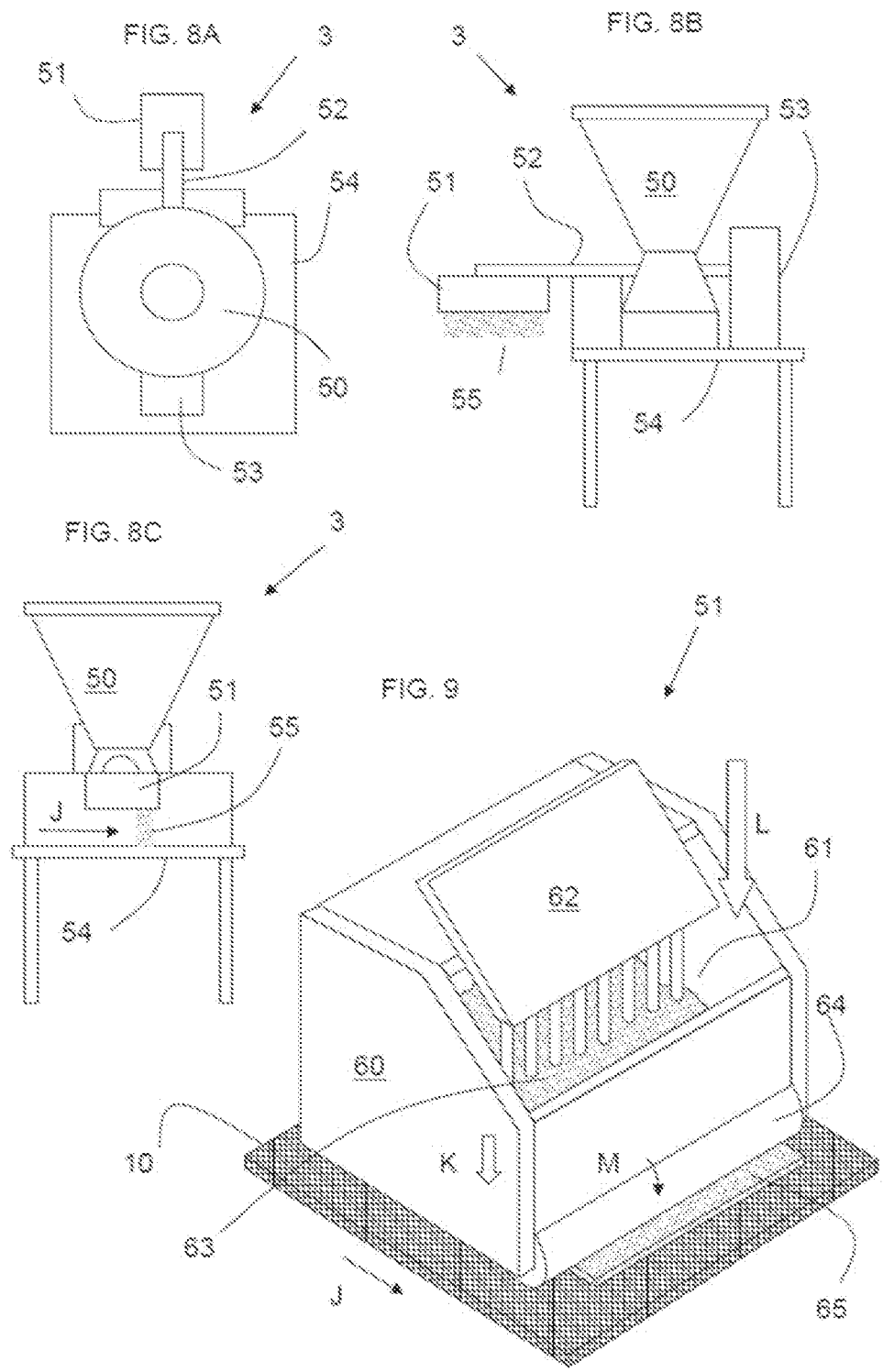

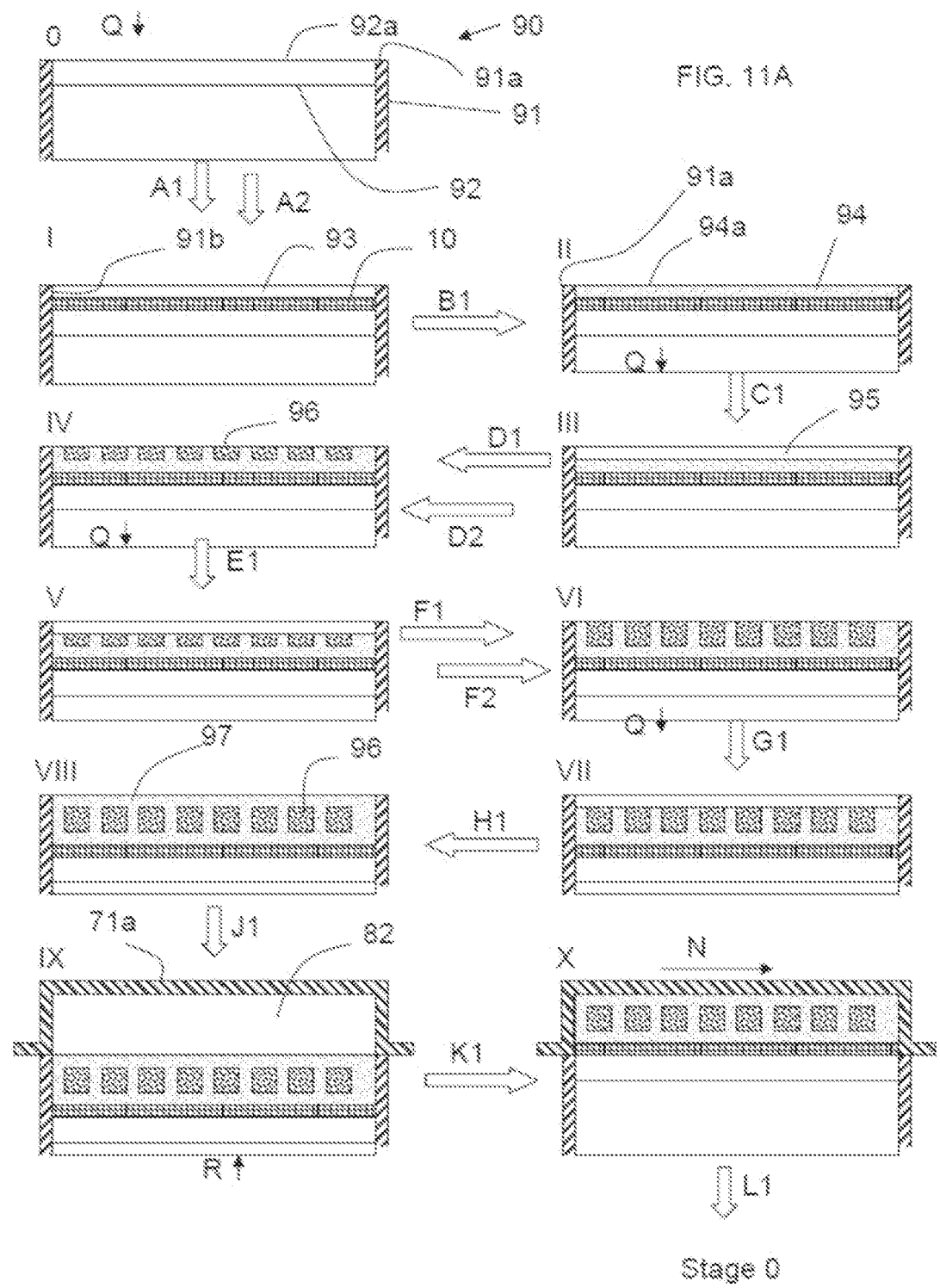

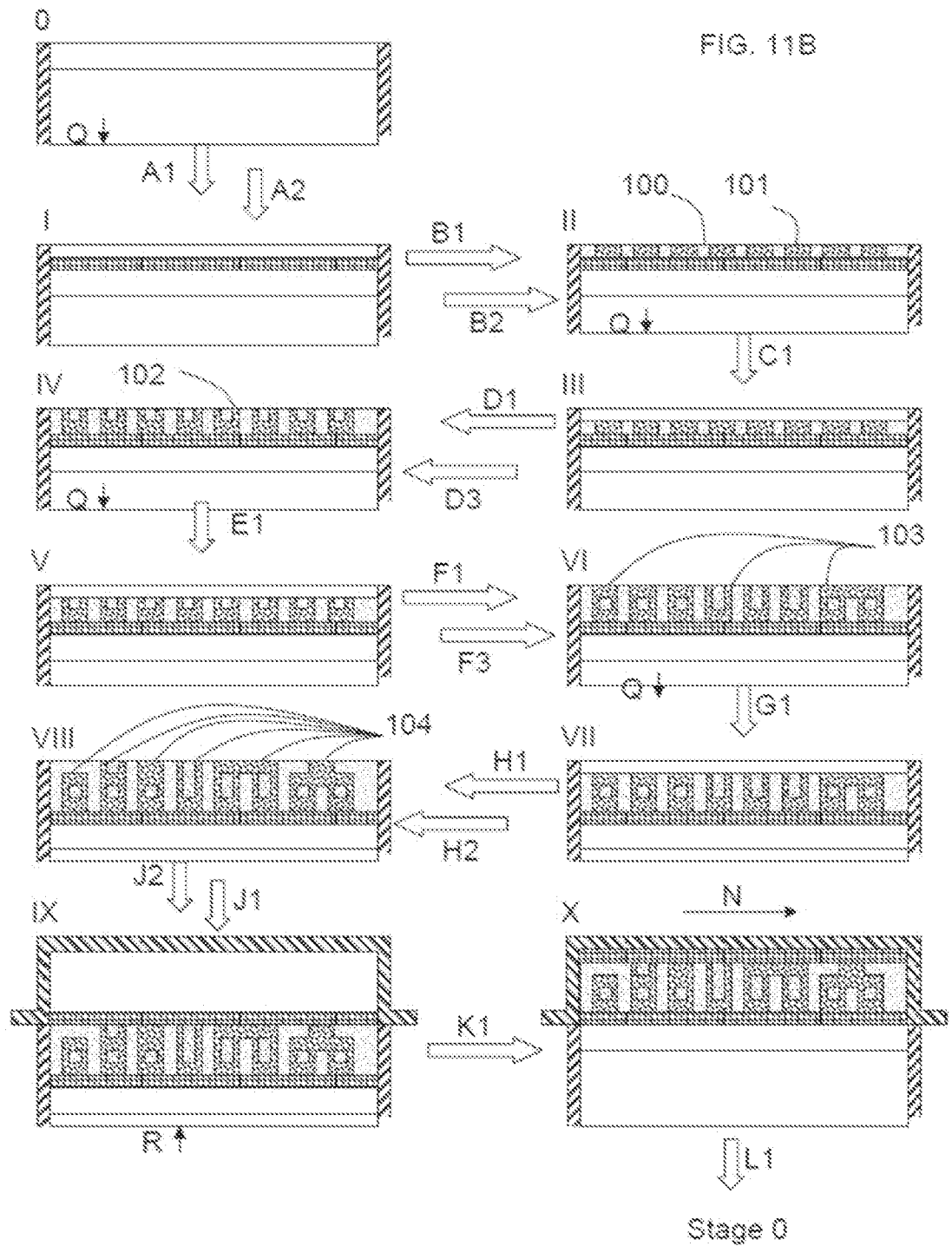

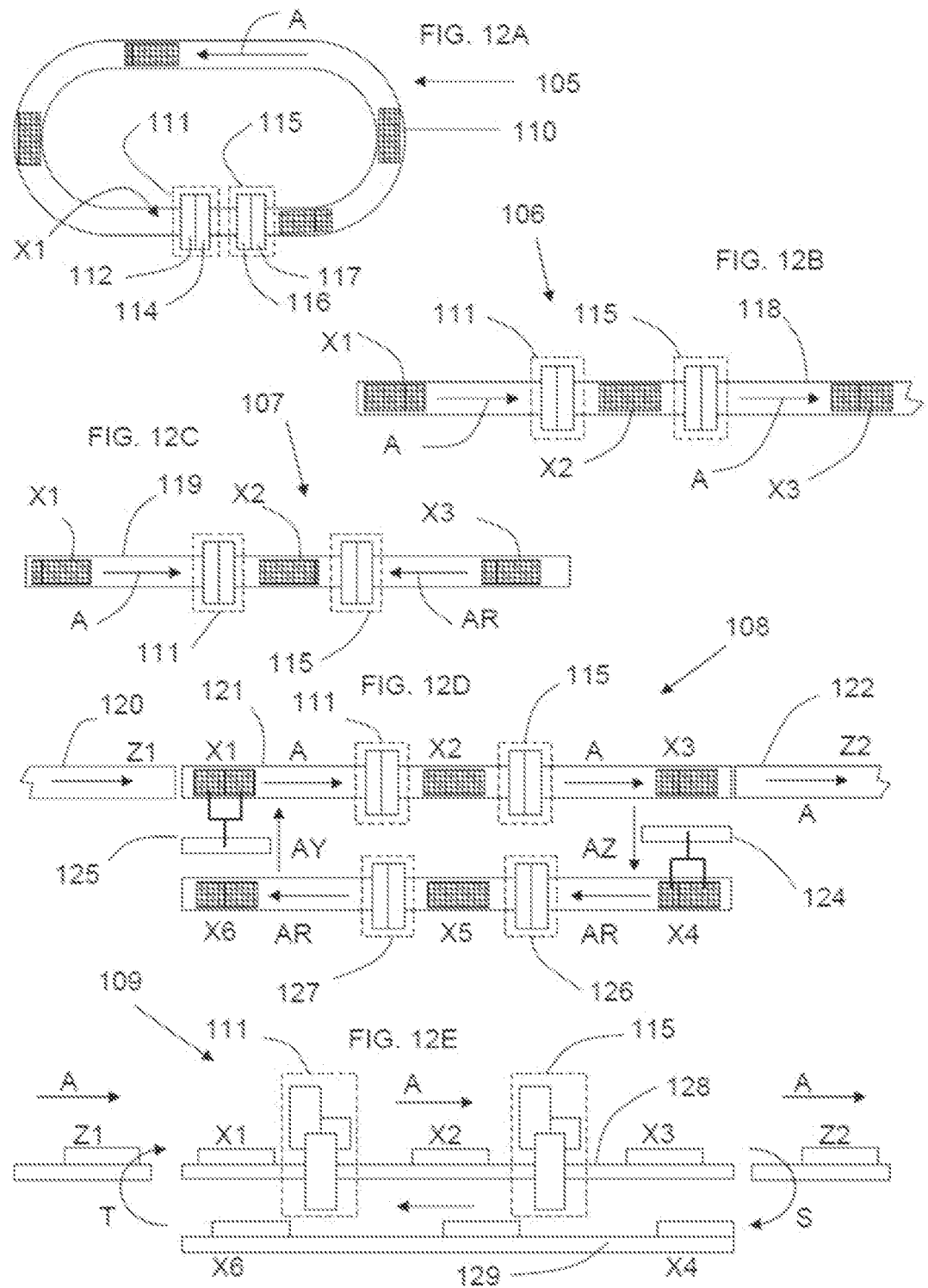

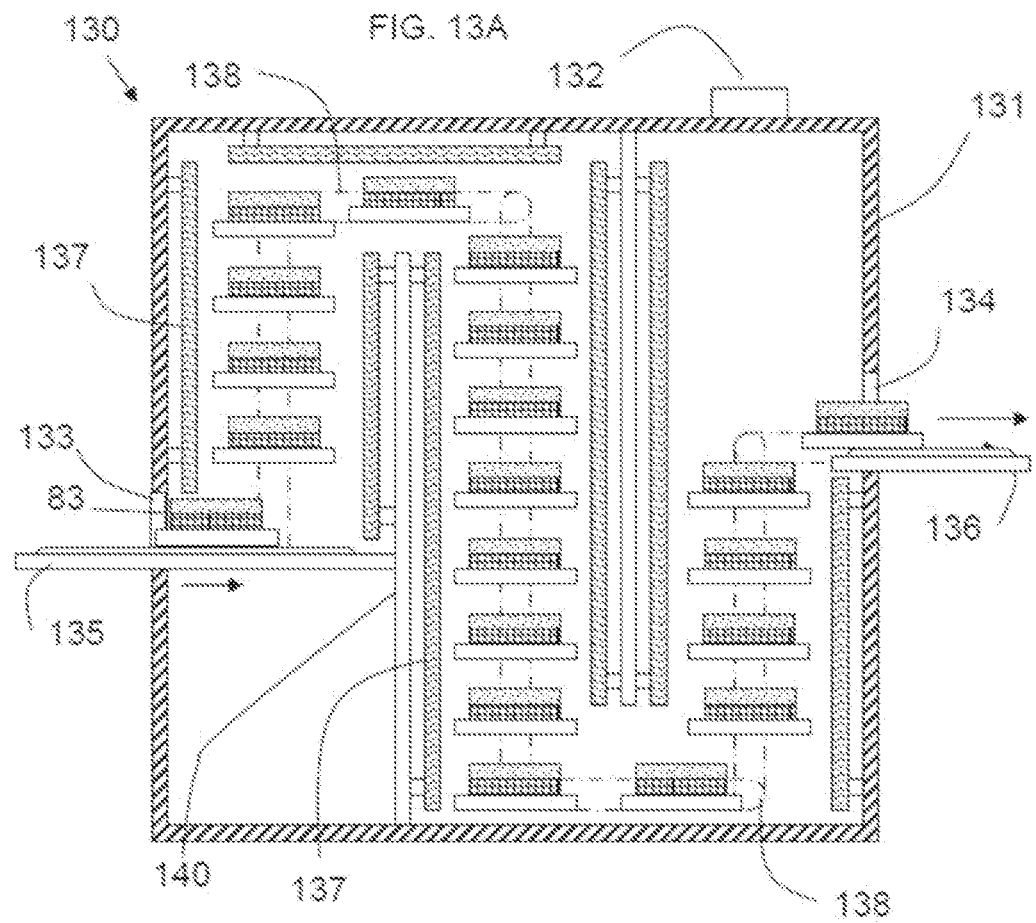
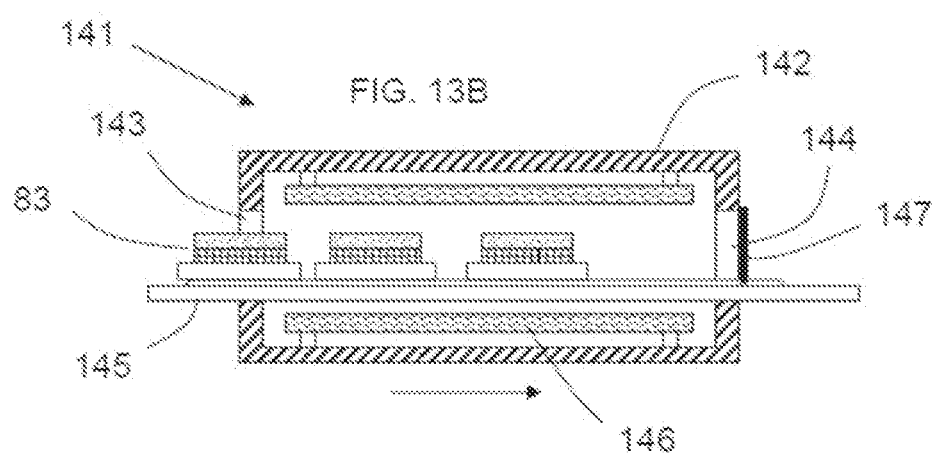

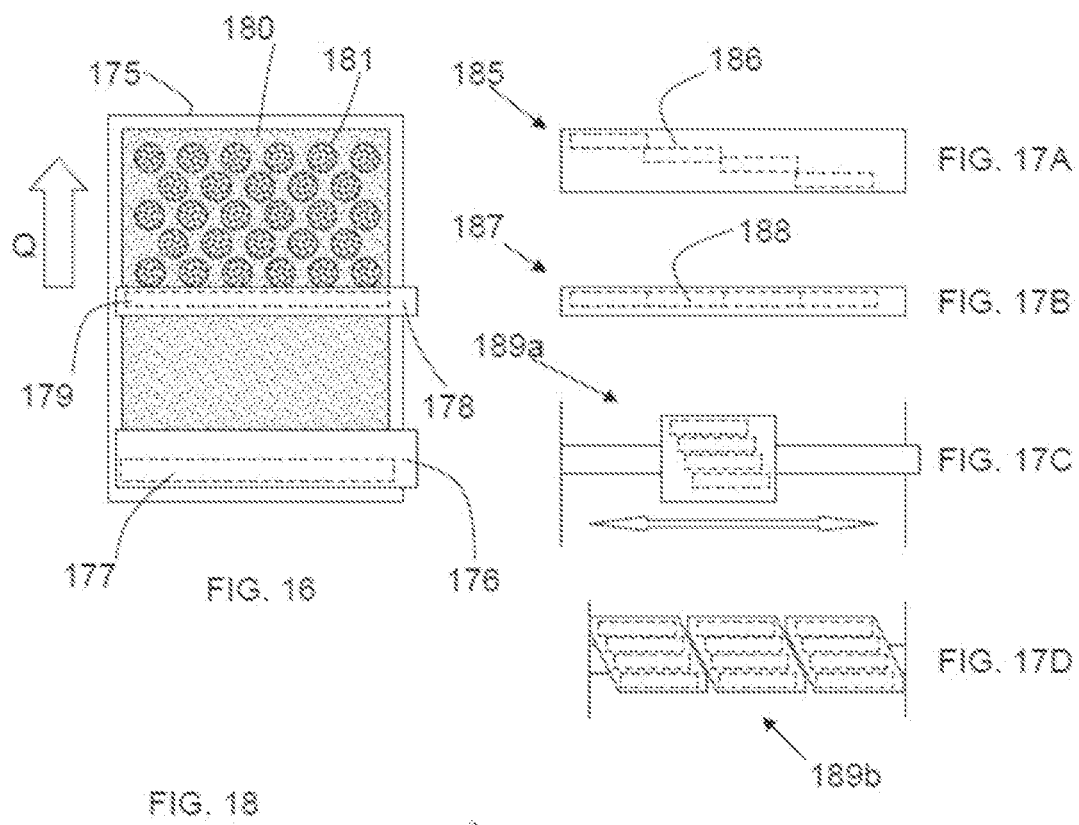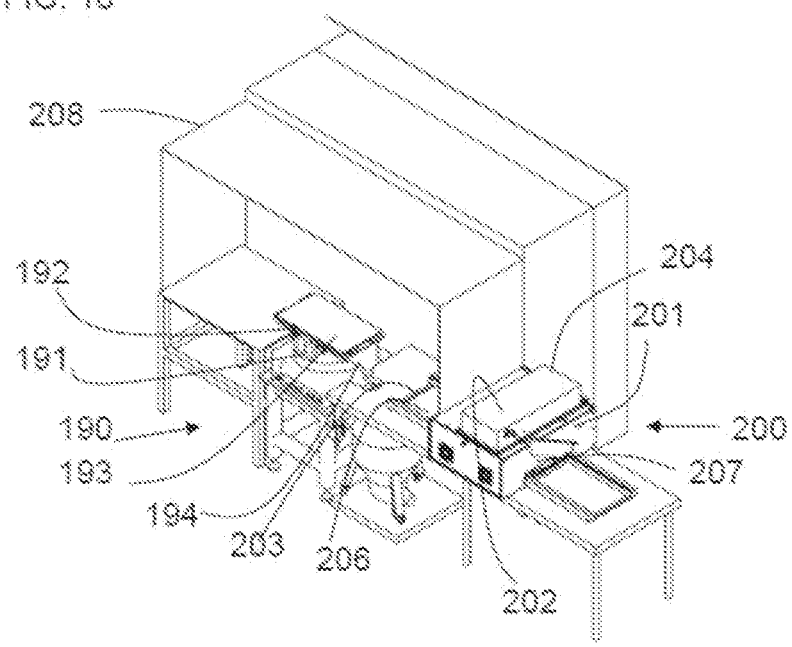

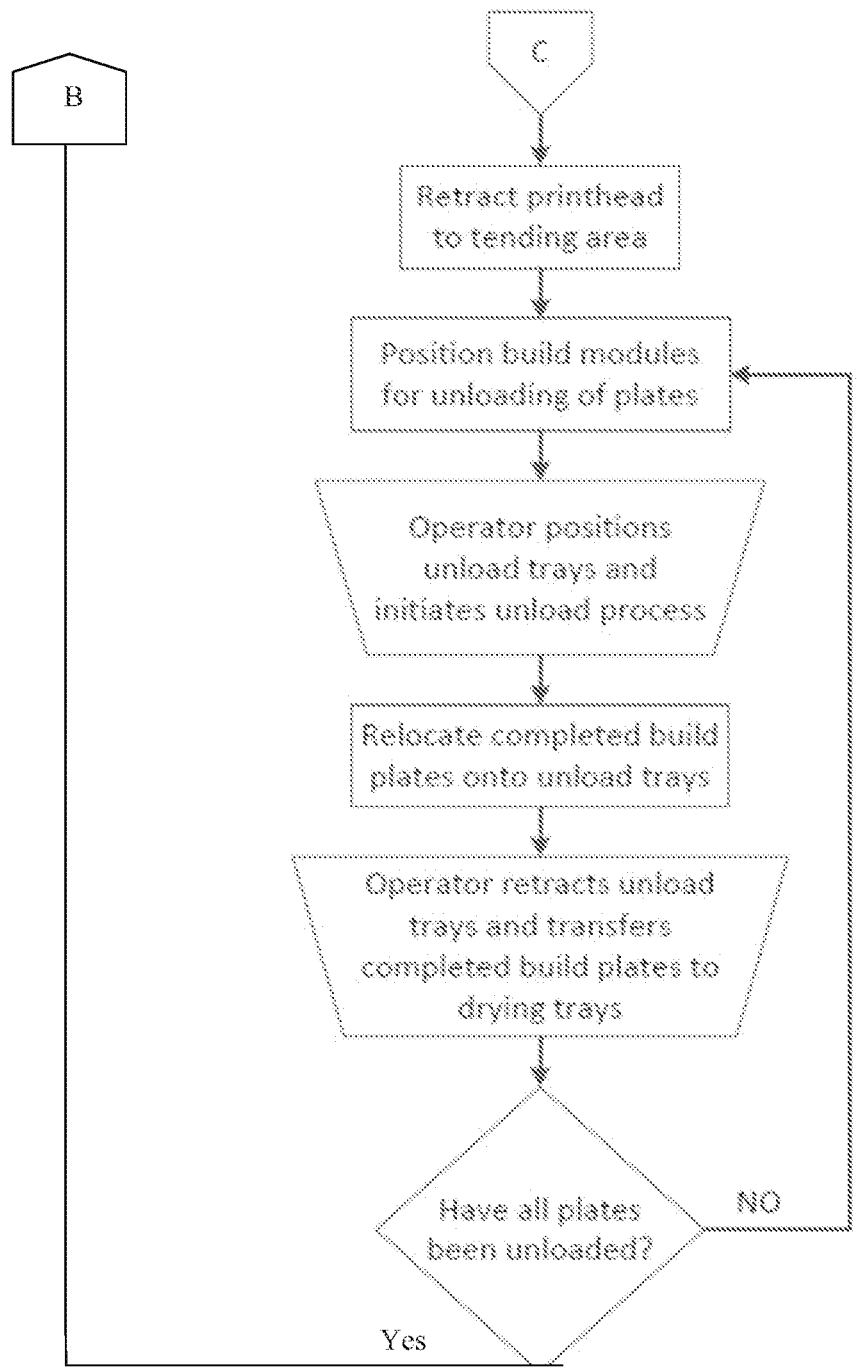

THREE-DIMENSIONAL PRINTING SYSTEM AND EQUIPMENT ASSEMBLY

CROSS-REFERENCE TO RELATED APPLICATIONS

This application is a continuation of U.S. Ser. No. 16/568,515 filed Sep. 12, 2019, which is a continuation of U.S. Ser. No. 15/981,365 filed May 16, 2018, now U.S. Pat. No. 10,449,712, issued Oct. 22, 2019, which is a continuation of U.S. Ser. No. 15/871,445 filed Jan. 15, 2018, now U.S. Pat. No. 10,118,335, issued Nov. 6, 2018, which is a continuation of U.S. Ser. No. 15/422,969 filed Feb. 2, 2017, now U.S. Pat. No. 9,908,293, issued Mar. 6, 2018, which is a continuation of U.S. Ser. No. 15/077,112 filed Mar. 22, 2016, now U.S. Pat. No. 9,517,592, issued Dec. 13, 2016, which is a continuation of U.S. Ser. No. 15/046,714 filed Feb. 18, 2016, now U.S. Pat. No. 9,517,591, issued Dec. 13, 2016, which is a continuation of U.S. Ser. No. 14/501,716 filed Sep. 30, 2014, now U.S. Pat. No. 9,610,735 issued Apr. 4, 2017, which is a continuation of U.S. Ser. No. 14/016,697, filed Sep. 3, 2013, now U.S. Pat. No. 8,888,480, issued Nov. 18, 2014, which is a continuation of International Application No. PCT/US2013/057466 filed Aug. 30, 2013, which claims the benefit of provisional application 61/696,839 filed Sep. 5, 2012, and the application U.S. Ser. No. 15/422,969 is a continuation of U.S. Ser. No. 14/501,716 filed Sep. 30, 2014, now U.S. Pat. No. 9,610,735 issued Apr. 4, 2017, the entire disclosures of which are hereby incorporated by reference.

FIELD OF THE INVENTION

The present invention concerns a manufacturing system and equipment assembly and use thereof for the preparation three-dimensional printing of articles from one or more powders and one or more liquids applied to the powder.

BACKGROUND OF THE INVENTION

Rapid prototyping describes various techniques for fabricating a three-dimensional prototype of an object from a computer model of the object. One technique is three-dimensional printing, whereby a printer is used to fabricate the 3-D prototype from a plurality of two-dimensional layers. In particular, a digital representation of a 3-D object is stored in a computer memory. Computer software sections the representation of the object into a plurality of distinct 2-D layers. Alternatively, a stream (sequential series) of instructions for each incremental layer maybe entered directly, e.g. a series of images. A 3-D printer then fabricates a thin layer of bound material for each 2-D image layer sectioned by the software. Together, the layers are printed one on top of the other and adhere to each other to form the desired prototype.

Three-dimensional powder-liquid printing technology has been used to prepare articles such as pharmaceutical dosage forms, mechanical prototypes and concept models, molds for casting mechanical parts, bone growth promoting implants, electronic circuit boards, scaffolds for tissue engineering, responsive biomedical composites, tissue growth promoting implants, dental restorations, jewelry, fluid filters and other such articles.

Three-dimensional printing is a solid freeform fabrication technique/rapid-prototyping technique in which thin layers of powder are spread onto a surface and selected regions of the powder are bound together by the controlled deposition ("printing") of a fluid. This basic operation is repeated layer-by-layer, with each new layer formed on top of and adhered to the previously printed layer, to eventually make three-dimensional objects within a bed of unbound powder. When the printed objects have sufficient cohesion, they may be separated from the unbound powder.

Systems and equipment assemblies for three-dimensional printing of articles are commercially available or in use by others: Massachusetts Institute of Technology Three-Dimensional Printing Laboratory (Cambridge, Mass.), Z Corporation's 3DP and HD3DP™ systems (Burlington, Mass.), The Ex One Company, L.L.C. (Irwin, Pa.), Soligen (Northridge, Calif.), Specific Surface Corporation (Franklin, Mass.), TDK Corporation (Chiba-ken, Japan), Therics L.L.C. (Akron, Ohio, now a part of Integra Lifesciences), Phoenix Analysis & Design Technologies (Tempe, Ariz.), Stratasys, Inc.'s Dimension™ system (Eden Prairie, Minn.), Objet Geometries (Billerica, Mass. or Rehovot, Israel), Xpress3D (Minneapolis, Minn.), and 3D Systems' Invision™ system (Valencia, Calif.).

Some systems have been described in the patent literature: U.S. Publications No. 20080281019, No. 20080277823, No. 20080275181, No. 20080269940, No. 20080269939, No. 20080259434, No. 20080241404, No. 20080231645, No. 20080229961, No. 20080211132, No. 20080192074, No. 20080187711, No. 20080180509, No. 20080138515, No. 20080124464, No. 20080121172, No. 20080121130, No. 20080118655, No. 20080110395, No. 20080105144, No. 20080068416, No. 20080062214, No. 20080042321, No. 20070289705, No. 20070259010, No. 20070252871, No. 20070195150, No. 20070188549, No. 20070187508, No. 20070182799, No. 20070182782, No. 20070168815, No. 20070146734, No. 20060268057, No. 20060268044, No. 20060230970, No. 20060141145, No. 20060127153, No. 20060111807, No. 20060110443, No. 20060099287, No. 20060077241, No. 20050054039, No. 20060035034, No. 20060030964, No. 20050247216, No. 20050204939, No. 20050197431, No. 20050179721, No. 20050104241, No. 20050069784, No. 20050061241, No. 20050059757, No. 20040265413, No. 20040262797, No. 20040252174, No. 20040243133, No. 20040225398, No. 20040187714, No. 20040183796, No. 20040145781, No. 20040145628, No. 20040145267, No. 20040143359, No. 20040141043, No. 20040141030, No. 20040141025, No. 20040141024, No. 20040118309, No. 20040112523, No. 20040056378, No. 20040012112, No. 20040005360, No. 20040005182, No. 20040004653, No. 20040004303, No. 20040003741, No. 20040003738, No. 20030207959, No. 20030198677, No. 20030143268, No. 20020125592, No. 20020114652, No. 20020079601, No. 20020064745, No. 20020033548, No. 20020015728, No. 20010028471, and No. 20010017085; U.S. Pat. Nos. 5,490,962, 5,204,055, 5,121,329, 5,127,037, 5,252,264, 5,340,656, 5,387,380, 5,490,882, 5,518,680, 5,717,599, 5,851,465, 5,869,170, 5,874,279, 5,879,489, 5,902,441, 5,934,343, 5,940,674, 6,007,318, 6,146,567, 6,165,406, 6,193,923, 6,200,508, 6,213,168, 6,336,480, 6,363,606, 6,375,874, 6,416,850, 6,508,971, 6,530,958, 6,547,994, 6,596,224, 6,772,026, 6,838,035, 6,850,334, 6,905,645, 6,945,638, 6,989,115, 7,220,380, 7,291,002 7,365,129, 7,435,368, 7,455,804, 7,686,955, 7,828,022, 8,017,055; PCT International Publications No. WO 00/26026, No. WO 98/043762, No. WO 95/034468, No. WO 95/011007; and European Patent No. 1,631,440, which employs a cylindrical (radial or polar) coordinate-based system due to its construction.

Three-dimensional printing systems that employ radial or polar coordinate-based printing systems are disadvantageous because having each jetting position located at a different radial position requires that the surface speed of the substrate underneath each jetting position will vary. The surface speed will be greatest for the jetting position furthest from the center of rotation. This can be compensated for by normalizing the print density across all jetting positions by either adjusting the input images or possibly the drive frequency. However, these methods of compensation simply cause objects printed radially to emulate each other as opposed to true replicates. The angle of entry of the droplets into the powder bed will also vary with radial position again creating subtle differences in the objects printed at different locations. Alignment and interleaving of multiple print heads is another disadvantage to radially printing. Although feasible it is more complex than for Cartesian systems.

SUMMARY OF THE INVENTION

The present invention provides a manufacturing system and equipment assembly useful for the preparation of articles by three-dimensional printing. The system and assembly can be used for high through-put continuous, semi-continuous, or batch manufacture with minimal product loss, high efficiency, and high product reproducibility in the context of flexible article design.

The invention provides a three-dimensional printing equipment assembly comprising: a) a three-dimensional printing build system comprising: a conveyor system adapted to conduct plural build modules; plural build modules engaged with the conveyor system, wherein the build modules are adapted to receive and temporarily retain powder from a powder layering system; and at least one build station comprising: 1) at least one powder layering system adapted to form incremental powder layers within build modules; and 2) at least one printing system adapted to apply a liquid according to a predetermined pattern to incremental powder layers within build modules; wherein the conveyor system repeatedly transports the build modules from the at least one powder layering system to the at least one printing system to form a three-dimensionally printed bed comprising one or more three-dimensionally printed articles in the build modules.

In some embodiments, the three-dimensional printing equipment assembly further comprises at least one liquid removal system adapted to receive one or more three-dimensionally printed beds and to remove liquid from one or more powder layers onto which the liquid has been applied and/or from the three-dimensionally printed bed.

In some embodiments, a build module comprises an incrementally height adjustable platform adapted to receive and temporarily retain at least one incremental layer or plural stacked incremental layers of powder. In some embodiments, a build module comprises a body comprising an upper surface with a cavity, a height adjustable build platform disposed within the cavity, height adjuster engaged with the body and the platform, and engagement means. In some embodiments, plural build modules are removably engaged with the conveyor system. In some embodiments, the platform is adapted to lower (recess) and/or raise by one or more increments after placement of an incremental layer of powder thereon. The platform displacement can occur prior to or after placement of a subsequent incremental layer of powder thereon, thereby press-rolling or removing a portion of powder from a powder layer that has already been laid down. In some embodiments, the size of an increment is predetermined. In some embodiments, the build module comprises one or more sidewalls surrounding the build plate and being adapted to retain powder on the height adjustable platform. In some embodiments, the build module further comprises a removable build plate disposed below the upper surface of the build module. In some embodiments, the removable build plate is disposed above the height adjustable platform and is adapted to receive and support one or more incremental layers of powder. In some embodiments, the removable build plate is flat, porous, perforated, textured, coated, knurled, smooth or a combination thereof. In some embodiments, engagement means are adapted to removably engage a build module with the conveyor system.

In some embodiments, the conveyor system conducts the plural build modules along a planar circuitous path, a horizontal circuitous path, a vertical circuitous path, or a combination thereof. In some embodiments, the conveyor system is adapted to transport plural build modules along a path in a counterclockwise direction or clockwise direction. In some embodiments, the path of the modular conveyor system is circular, ellipsoidal, rectangular, semicircular, square, triangular, pentagonal, hexagonal, octagon, oval, polygonal, parallelogram, quadrilateral, geometric, symmetrical, asymmetrical, or equivalents thereof with rounded corners and/or edges. In some embodiments, the modular conveyor system comprises plural conveyor modules, at least one drive motor, at least one positioning controller, and a path along which plural build modules are conducted. In some embodiments, a conveyor module comprises a body, one or more build module engagement means, and conveyor module engagement means by way of which plural conveyor modules are adapted to engage to form a modular conveyor. In some embodiments, the conveyor system comprises plural attachments adapted to removably retain the plural build modules. In some embodiments, the attachment comprises plural one or more metal links with cam followers or comprises wheels, plates and/or bearings attached to a build module and mounted on a rail system upon which the build module is conducted. In some embodiments, the conveyor system further comprises one or more positioning-controllers. In some embodiments, the conveyor system is a continuous or discontinuous loop system.

In some embodiments, the at least one build station is incrementally height adjustable with respect to the build modules, whereby the vertical space between the build module and the build station can be adjusted by one or more increments. In some embodiments, an incrementally height adjustable build station is adapted to raise by one or more increments after placement of a layer of powder on a build module and prior to placement of a subsequent layer of powder the build module. In some embodiments, a change in height is achieved by changing vertical position with respect to a prior position of the platform or with respect to an absolute position of the platform relative to the build module. In some embodiments, the build station is vertically fixed with respect to the build modules and a build platform within a build module is vertically height adjustable with respect to the build module so that the vertical distance between the build station and the build module remains the same during a print lap or print cycle.

In some embodiments, the size of the increment is the same for each incremental layer of a build cycle, is different for one or more incremental layers of a build cycle or a combination thereof. A build cycle comprises one or more build laps or plural build laps and is defined as the sum total of build laps required to form a 3DP article. A build lap is defined as the process of forming a printed incremental layer, i.e. placing an incremental layer of powdered build material and depositing (printing) liquid upon it. Accordingly, a build cycle results in the formation of plural stacked printed incremental layers that adhere to one another to together form a three-dimensionally printed article.

In some embodiments, the at least one powder layering system comprises at least one powder fill head. In some embodiments, the powder fill head is stationary, meaning it does not move, either longitudinally or transversely with respect to the plane of the upper surface of a build module, when applying an incremental layer of powder onto the build module. In some embodiments, a powder fill head comprises at least one powder fill head body, at least one powder spreader, and at least one powder-height controller. In some embodiments, a powder layering system comprises a powder fill head, at least one powder reservoir and a powder feeder tube adapted to transfer powder from the powder reservoir to the powder fill head. In some embodiments, the powder spreader is a cylindrical roller the axis of which has or defines a radial direction of motion opposite the linear direction of motion of a build module through the powder layering system. In some embodiments, the powder spreader is a cylindrical roller, bar, rod, plate or straight smooth edge. In some embodiments, the powder fill head comprises a hopper or chute.

In some embodiments, the at least one printing system is adapted to apply (deposit) liquid to the powder according to a Cartesian coordinate algorithm instead of a polar (radial) coordinate algorithm (cylindrical coordinate system, circular coordinate system, or spherical coordinate system). In some embodiments, the printing system comprises at least one print head adapted to deposit liquid onto an incremental layer of powder in a build station and at least one liquid feed system. A print head can comprise one or more print modules or plural print modules. In some embodiments, the invention excludes a printing system adapted to apply liquid to the powder solely according to a polar (radial) coordinate system. In some embodiments, the invention excludes an equipment assembly or a method wherein the powder fill head moves laterally or transversely or is not stationary, with respect to a build module, while depositing an incremental powder layer. In some embodiments, the invention excludes an equipment assembly or a method wherein the print head moves laterally or transversely or is not stationary, with respect to a build module, while applying liquid to an incremental powder layer.

In some embodiments, the at least one printing system is adapted to apply (deposit) liquid as a three-dimensional pattern of droplets or as plural two-dimensional patterns of droplets defining one or more articles. In some embodiments, the pattern comprises droplets placed at equal spacing within one or more articles. In some embodiments, this pattern comprises droplets placed at unequal spacing within one or more articles. In some embodiments, this pattern comprises droplets with different spacing within different regions of an article. In some embodiments, this pattern comprises droplets with tighter spacing (i.e., higher print density) in a region defining the exterior of an article. In some embodiments, this pattern comprises droplets with looser spacing (i.e., lower print density) in a region interior to an article.

In some embodiments, more than one pattern is used. In some embodiments, more than one liquid is used. In some embodiments, the liquid comprises a pure solvent, blend of solvents, solution, suspension, colloid, emulsion, melt or a combination thereof.

In some embodiments, both the print head and the powder fill head are stationary during formation of a printed incremental layer or are stationary as otherwise described herein.

In some embodiments, the equipment assembly further comprises a bed transfer system adapted to transfer three-dimensionally printed beds, one or more at a time, away from the three-dimensional printing build system. In some embodiments, the bed transfer system is adapted to transfer three-dimensionally printed beds to one or more liquid removal systems and/or one or more harvesting systems. In some embodiments, the transfer system is integrated with the conveyor system, the liquid removal system or both.

In some embodiments, the liquid removal system comprises at least one dryer. In some embodiments, the liquid removal system is adapted to process two or more build plates and their contents at a time. In some embodiments, the liquid removal system is adapted to process two or more printed beds at a time. In some embodiments, the liquid removal system is adapted to process two or more printed articles at a time.

In some embodiments, the three-dimensionally printed powder bed comprises loose (unbound) powder and one or more three-dimensionally printed articles prior to harvesting of the printed article(s) from the loose powder. In some embodiments, the equipment assembly comprises one or more harvesting systems adapted to separate loose powder from the one or more three-dimensionally printed articles. In some embodiments, the harvesting system processes printed beds already processed by the liquid removal system. In some embodiments, the harvesting system comprises loose powder collector and three-dimensionally printed article collector. In some embodiments, the harvesting system comprises a vibrating or orbiting surface adapted to receive the three-dimensionally printed powder bed or the three-dimensionally printed articles. In some embodiments, the harvesting system comprises a vacuum conveyor with a screen to separate articles from loose powder. The vibrating surface can be perforated, non-perforated, corrugated, smooth or non-smooth to permit separation of loose powder from the printed articles.

In some embodiments, the equipment assembly further comprises a dedusting system adapted to remove loose particles from printed articles that have been harvested from a printed powder bed. A dedusting system can comprise a housing defining a dedusting region, one or more air jets, e.g. one or more air knives, that direct pressurized air into the dedusting region, one or more surfaces or retainers in the dedusting region for temporarily retaining one or more printed articles being dedusted, and one or more outlets through which air and removed particles exit the housing or dedusting region.

In some embodiments, the equipment assembly further comprises a build plate loading system adapted to place one or more build plates on the height adjustable platform(s) of the one or more build modules.

In some embodiments, the equipment assembly further comprises one or more powder recovery systems adapted to collect powder from the one or more systems of the equipment assembly and return it to a powder reservoir. The recovery system can comprise one or more loose powder collectors and one or more conduits for conducting loose powder from the one or more collectors to a powder reservoir. The recovery system can further comprise: a) one or more powder mixers for mixing recovered loose powder with virgin loose powder; b) one or more pressurized air powder handling systems that facilitate transfer of loose powder from one location to another; c) one or more vacuum powder handling systems that facilitate transfer of loose powder from one location to another; d) one or more mechanical powder handling systems that transfer loose powder from one location to another; e) one or more manual powder handling systems that transfer loose powder from one location to another; or f) a combination thereof.

In some embodiments, the equipment assembly further comprises a control system comprising one or more computerized controllers, one or more computers, and one or more user interfaces for one or more computers. In some embodiments, one or more components of the equipment assembly are computer controlled. In some embodiments, one or more components of the three-dimensional printing build system are computer controlled. In some embodiments, the conveyor system, the height adjustable platforms of the build modules, the at least one powder layering system and the at least one printing system are computer controlled. In some embodiments, the equipment assembly is adapted to spread layers of powder and deposit (print) droplets of liquid in a predetermined pattern on to the layers according to instructions provided by a computerized controller. In some embodiments, the predetermined pattern is based on one or more two-dimensional image files comprising pixels. In some embodiments, the two-dimensional image files are structured such that certain pixels indicate dispensing of droplets, and other pixels represent no dispensing of droplets. In some embodiments, the two-dimensional image files include different colors of pixels to indicate dispensing of different liquids, or no dispensing of liquid.

In some embodiments, the predetermined pattern for applying the liquid is the same in each incremental layer, is the same in two or more incremental layers, is different in one or more incremental layers, is different in all incremental layers, or is the same for a first group of incremental layer and the same for a second group of incremental layers but the pattern for the first group is different than the pattern for the second group.

In some embodiments, the equipment assembly further comprises one or more working surfaces, tables, gantries, enclosures, and/or platforms.

The invention also provides a three-dimensional printing equipment assembly comprising: a) a three-dimensional printing build system comprising: a conveyor system adapted to conduct plural build modules and comprising positioning-controller and plural build module engagements; plural build modules engaged with the conveyor system, wherein the build modules are adapted to receive and temporarily retain powder from a powder layering system, and wherein a build module comprises an incrementally height adjustable platform, an optional build plate disposed above the platform, and one or more sidewalls defining a cavity within which the platform the optional build plate can be disposed; at least one build station comprising: 1) at least one powder layering system adapted to form incremental powder layers within the cavity of build modules and comprising at least one powder fill head, at least one powder spreader and at least one powder reservoir; and 2) at least one printing system adapted to apply a liquid according to a predetermined pattern to incremental powder layers within build modules and comprising at least one liquid feed system and at least one print head adapted to deposit liquid according to a predetermined pattern onto incremental layers of powder in a build module; wherein the conveyor system is adapted to repeatedly transport the plural build modules from the at least one powder layering system to the at least one printing system, whereby the three-dimensional printing build system forms a three-dimensionally printed bed comprising one or more three-dimensionally printed articles, and optionally loose (unbound or only partially bound) powder that has not been printed upon; b) at least one harvesting system adapted to separate loose powder from one or more three-dimensionally printed articles in a three-dimensionally printed bed; and c) optionally, at least one liquid removal system adapted to remove liquid from one or more incremental powder layers onto which the liquid has been applied and/or from the three-dimensionally printed bed, wherein the liquid removal system is adapted to process two or more build modules at a time.

Some embodiments of the invention include those wherein: 1) at least one liquid removal system is present; 2) the equipment assembly further comprises at least one packaging system adapted to package one or more three-dimensionally printed articles; 3) the conveyor system is adapted to repeatedly transport the plural build modules, from the at least one powder layering system to the at least one printing system, in a linear manner, and not a radial manner, thereby facilitating Cartesian coordinate printing and not radial (polar coordinate) printing; 4) the equipment assembly further comprises a powder recovery system for recovering, and optionally recycling, unprinted powder; 5) the equipment assembly further comprises a liquid detector; 6) a liquid detector detects the presence of liquid in one or more printed incremental layers and/or in one or more printed articles; 7) the equipment assembly further comprises an inspection system; 8) an inspection system is a printed powder inspection system that determines the integrity of printing in one or more printed incremental layers and/or one or more printed articles and/or determines whether or not powder was properly applied in one or more incremental layers; 9) determining the integrity of printing comprises at least one of determining whether or not liquid has been correctly applied to one or more incremental layers according to one or more predetermined patterns and/or determining whether or not liquid has been correctly applied to one or more incremental layers according to a predetermined amount; 10) the inspection system is a printed article inspection system that determines whether or not one or more printed articles have the correct size, shape, weight, appearance, density, content and/or color; 11) the inspection system is a liquid application inspection system that monitors droplets of liquid applied by the print head to powder; 12) the inspection system comprises one or more cameras; and/or 13) a camera is independently selected at each occurrence from the group consisting of a visible wavelength camera, an UV wavelength camera, a near infrared wavelength camera, an x-ray camera and an infrared wavelength camera.

The invention includes all combinations of the embodiments, subembodiments and aspects disclosed herein. Accordingly, the invention includes the embodiments and aspects specifically disclosed, broadly disclosed, or narrowly disclosed herein, as well as combinations thereof and subcombinations of the individual elements of said embodiments and aspects.

Other features, advantages and embodiments of the invention will become apparent to those skilled in the art by the following description, accompanying examples.

BRIEF DESCRIPTION OF THE FIGURES

The following figures form part of the present description and describe exemplary embodiments of the claimed invention. These drawings are not necessarily drawn to scale, and are instead intended to illustrate the general principles of the invention as further described herein. Although specific embodiments are described below with specific reference to the drawings provided, other embodiments are possible without deviating from the spirit and scope of the present invention. The skilled artisan will, in light of these figures and the description herein, be able to practice the invention without undue experimentation.

FIG. 1 depicts a top plan view of an exemplary layout of a three-dimensional printing equipment assembly of the invention.

FIG. 2A depicts a front elevation view of an exemplary build module of the invention.

FIG. 2B depicts a partial perspective side view of the build module of FIG. 2A.

FIG. 2C depicts a front elevation view of three segments of a segmented or modular conveyor system.

FIG. 2D depicts a top plan view of the three segments of FIG. 2C.

FIG. 2E depicts a side elevation view of an optional exemplary aspirator.

FIG. 3A depicts a top plan view of an exemplary printing system of the invention.

FIG. 3B depicts a side elevation view of the exemplary printing system of FIG. 3A.

FIG. 3C depicts a front elevation view of the exemplary printing system of FIG. 3A.

FIG. 4 depicts a bottom perspective view of an exemplary layout of print modules in the print head of a printing system.

FIG. 5 depicts bottom plan views of alternate exemplary layouts for the print modules in different print heads.

FIG. 6 depicts alternate exemplary shapes of the build plates of the invention.

FIG. 7A depicts a top plan view of an exemplary build plate loading system of the invention.

FIG. 7B depicts a side elevation view of the exemplary build plate loading system of FIG. 7A.

FIG. 8A depicts a top plan view of an exemplary powder layering system of the invention.

FIG. 8B depicts a side elevation view of the exemplary powder layering system of FIG. 8A.

FIG. 8C depicts a front elevation view of the exemplary powder layering system of FIG. 8A.

FIG. 9 depicts a perspective view of an exemplary powder fill head of the invention.

FIGS. 11A-11B depict partial sectional side elevation views of alternate embodiments of exemplary three-dimensional printing processes in a build module of the invention.

FIGS. 12A-12D depict top plan views of exemplary layouts of a three-dimensional printing build system of the invention.

FIG. 12E depicts a side elevation view of an exemplary layout of a three-dimensional printing build system of the invention.

FIG. 13A depicts a partial sectional side elevation view of an exemplary dryer or fluid removal system of the invention.

FIG. 13B depicts a partial sectional side elevation view of an alternate exemplary dryer or fluid removal system of the invention.

FIG. 16 depicts a partial top plan view of an exemplary build station comprising a powder layering system and a print head.

FIGS. 17A-17D depict top plan views of various different embodiments of a print head and arrangements thereof.

FIG. 18 depicts a perspective view of a combination harvester system and deduster or dedusting system assembly.

FIGS. 19A-19C together depict an exemplary logic flow for operation of the equipment assembly of the invention. FIG. 19A continues to FIG. 19B, which continues to FIG. 19C, which refers back to FIG. 19A.

DETAILED DESCRIPTION OF THE INVENTION

Figure 10A:
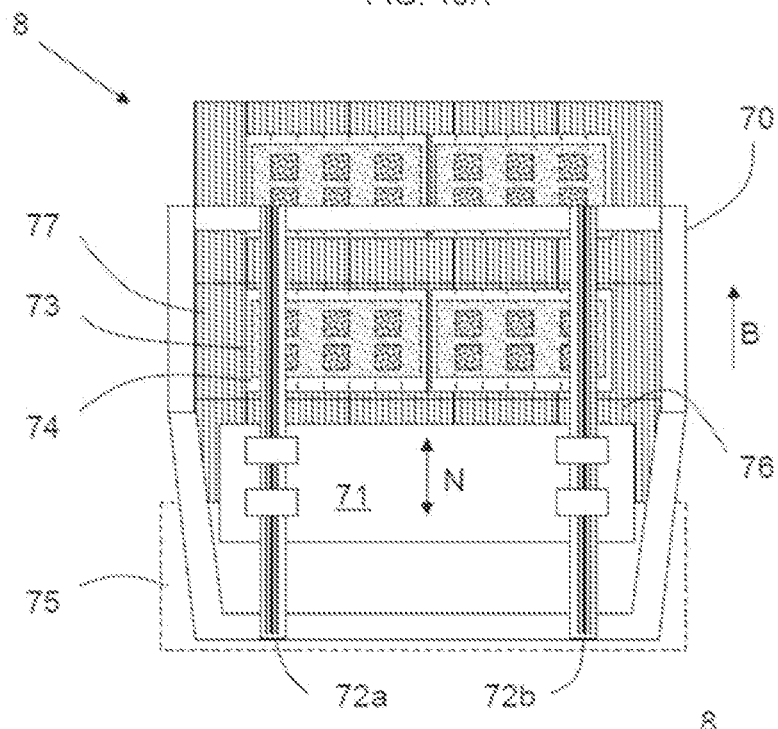
FIG. 10A depicts a top plan view of an exemplary bed transfer system of the invention.

The invention provides an equipment assembly and system useful for the manufacture of articles via a three-dimensional printing process. The assembly and system are suitable for small scale/volume, medium scale/volume and large scale/volume preparation of articles. The three-dimensional printing process comprises forming an incremental layer of powder on a surface and subsequently printing/applying a liquid onto the layer, then repeating the steps of forming and printing a sufficient number of times to form a printed powder bed comprising one or more intended three-dimensionally printed articles and loose powder. Any excess/undesired liquid remaining in the article(s) is removed and the loose powder is separated from the article, which is then collected.

Generally, a three-dimensional printing equipment assembly or system comprises various subsystems including one or more three-dimensional printing build systems, one or more harvesting systems, and optionally one or more liquid removal systems. The equipment assembly can comprise one or more three-dimensional printing build systems, one or more harvesting systems, one or more liquid removal systems and optionally one or more other systems. In some embodiments, the equipment assembly further comprises one or more (sub)systems selected from one or more build plate loading systems, one or more powder recovery systems, one or more control systems, one or more build module or conveyor positioning systems, one or more conveyor drive motors, one or more bed transfer systems, or a combination of systems thereof.

As used herein, a "three-dimensional printing build system" generally comprises a conveyor system, plural build modules, at least one build station, and optionally one or more other components. The function of the three-dimensional printing build system is to form one or more three-dimensionally printed articles from a multilayered bed of powder in a build module. Plural build modules are engaged with a conveyor system that is adapted to conduct the build modules along a predetermined path which passes through one or more build stations. A build module is conducted to a powder layering system, and an incremental layer of powder is formed on the upper surface of a cavity of a build module. The build module is then conducted to a printing system, and a liquid is applied to the incremental layer of powder according to a predetermined pattern thereby forming a partially or fully bound powder layer (a printed incremental layer). The steps of conducting the build module, forming an incremental layer of powder and applying a liquid to the layer are considered to be a single build lap of the process. Build laps are repeated in build modules such that a printed incremental layer from one lap adheres to a printed incremental layer from a prior or subsequent lap. Build laps are repeated in build modules a sufficient number of times to form a three-dimensionally printed bed comprising one or more three-dimensionally printed articles and loose powder, wherein the three-dimensionally printed article comprises at least two printed incremental layers. The liquid applied to the pattern may or may not dry sufficiently under ambient conditions between build laps; therefore, a liquid removal step can be included between build laps. If, however, the liquid does not dry sufficiently between build laps, then an optional liquid removal step can be conducted following completion of all the build laps, i.e. following completion of a build cycle, for an intended three-dimensionally printed article.

The conveyor system is adapted to conduct build modules through a predetermined course/path during and between build laps. Substantially any system useful for conveying solid materials from a first location to a second location and back to the first location can be used. In some embodiments, the conveyor system is a cyclic, linear or oscillating conveyor system. In some embodiments, the cyclic conveyor system conducts build modules from the first location to a second location and then back to the first location. In some embodiments, the conveyor system is a cyclic or iterative conveyor system that conducts build modules two or more times through the same build station(s). In some embodiments, the linear conveyor system conducts build modules from a first build station to a second build station and optionally one or more other build stations. In some embodiments, the oscillating system conducts one or more build modules through at least one build station in a first direction and then conducts the one or more build modules through the at least one build station in an opposite direction.

FIG. 1 depicts a top plan view of an exemplary three-dimensional printing equipment assembly (1) comprising a conveyor (2) adapted to conduct plural build modules (6) engaged with the conveyor system along a predetermined path through build regions in one or more build stations, respectively, comprising: a) at least one powder layering system (3) adapted to form incremental powder layers within build modules; and b) at least one printing system (4) adapted to apply a liquid according to a predetermined pattern to incremental powder layers within build modules. The build modules are adapted to receive and temporarily retain powder from the powder layering system. In the cyclic system depicted, the conveyor system is a continuous loop system that repeatedly transports/cycles the build modules from the at least one powder layering system to the at least one printing system to form a three-dimensionally printed bed comprising one or more three-dimensionally printed articles in the build modules. The exemplary conveyor system (2) comprises at least one drive (12) and plural conveyor modules (2a), thereby forming a segmented or modular conveyor system. A conveyor module is engaged with a corresponding build module and conducted along a predetermined pathway in the direction of Arrow A.

The equipment assembly in FIG. 1 is depicted finishing three-dimensional printing of a first batch of 3-D (three dimensional) articles and starting the 3-D printing of a second batch of 3-D articles. A three-dimensionally printed bed from the end of a first build cycle is in build module (6a), and the beginning of the second batch starts with a printed incremental layer in build module (6L). Build module (6a) includes six 3-D articles in a printed bed of powder. As the build modules (6, 6a-6L) are conducted along the predetermined course, they pass through the bed transfer system (8), which transfers build plates containing completed three-dimensionally printed beds, one or more at a time, away from the three-dimensional printing build system. A build module comprises a body (7a), and upper surface (7c) having a cavity with in which a height adjustable build platform (7b) is disposed. An empty build module (6g) optionally receives a build plate (10) as it passes through the build plate loading region of an optional build plate loading system (9). The build module (6h) is now ready to receive powder. Build modules will pass through at least one build station comprising at least one powder layering system (3) and at least one printing system (4).

The build module (6j) is depicted passing through the powder dispensing region of a powder layering system (3). The build module (6k) is depicted between the powder layering system (3) and the printing system (4) and in the recovery region of an optional powder recovery system (11), which pick ups loose powder from the upper surface of build modules. The build module (6L), which is the first build module of the next build lap, is depicted passing through the printing region of the printing system (4). A control system, comprising at least one or more computers and one or more use interfaces (5), can be used to control and integrate (coordinate) operation of the various components and systems of the equipment assembly (1). In some embodiments, operation of each of the conveyor system, the height adjustable platforms of the build modules, the at least one powder layering system, and the at least one printing system are controlled by the control system. In some embodiments, operation of one or more of the build plate loading system (9), optional powder recovery system (11) and bed transfer system is controlled by the control system.

An equipment assembly can further comprise a bed transfer system (8) adapted to transfer three-dimensionally printed beds, one or more at a time, away from the three-dimensional printing build system. The exemplary bed transfer system (8) depicted is adapted to simultaneously remove two or more printed beds from respective build modules in a bed transfer region. In some embodiments, the bed transfer system is adapted to transfer three-dimensionally printed beds and corresponding build plates (and/or build modules), one or more at a time, away from the three-dimensional printing build system.

In some embodiments, a three-dimensional printing equipment assembly comprises: a) a three-dimensional printing build system comprising: a conveyor system adapted to conduct plural build modules; plural build modules engaged with the conveyor system, wherein the build modules are adapted to receive and temporarily retain powder from a powder layering system; and at least one build station comprising: 1) at least one powder layering system adapted to form incremental powder layers within build modules temporarily disposed in a powder dispensing region of the build station; and 2) at least one printing system adapted to apply a liquid according to a predetermined pattern to incremental powder layers temporarily disposed within build modules in a printing region of the build station; wherein the conveyor system repeatedly transports the build modules from the powder dispensing region of the at least one powder layering system to the printing region of the at least one printing system to form a three-dimensionally printed bed comprising one or more three-dimensionally printed articles in the build modules; b) at least one bed transfer system adapted to transfer completed three-dimensionally printed beds, one or more at a time, away from the build region of the three-dimensional printing build system; c) at least one harvesting system adapted to separate loose powder from one or more three-dimensionally printed articles in a three-dimensionally printed bed; d) at least one control system adapted to control one or more systems of the equipment assembly; e) optionally, at least one liquid removal system; and f) optionally, at least one packaging system adapted to package one or more three-dimensionally printed articles.

A build module receives and retains powder deposited thereon by a powder layering system. In some embodiments, the build module comprises a height adjustable platform disposed within a cavity in the upper surface of the build module, wherein the cavity is defined by sidewalls. The height adjustable platform in combination with the sidewalls forms a cavity for the powder. The platform can be adapted to raise or lower incrementally. Powder is placed within the cavity and either directly or indirectly (such as by way of a build plate) onto the platform.

FIGS. 2A-2B depict an exemplary build module (15), wherein FIG. 2A is a front elevation view and FIG. 2B is a perspective side view. The build module comprises a body (16a), a cavity (16b) in the upper surface (16d) as defined by the surrounding walls (16c), and height adjuster (19a, 19b) engaged with and adapted to raise and lower the height adjustable platform (17) disposed in the cavity. The build module is depicted with a build plate (18) disposed above the platform, and engagement (20) by way of which it is engaged with the conveyor system. A build module can be permanently or removably engaged with the conveyor system. Although the body and cavity of the build module are depicted having a rectangular shape, they can be shaped as needed. The height adjuster can comprise one or more height adjusters. In some embodiments, the height adjuster is incrementally height adjustable thereby rendering the height adjustable platform also incrementally height adjustable. In some embodiments, an incrementally height adjustable component or system is adapted to raise by one or more increments before and/or after placement of a layer of powder on a build module and prior to placement of a subsequent layer of powder the build module.

The height of an increment (thus the thickness of an incremental layer) can be controlled in different ways. In some embodiments, the height adjuster is computer controlled, whereby the computer controls raising or lowering of the height adjusting means by the size of an increment and/or by the number of increments. The size (vertical displacement) of an increment can vary from incremental layer to incremental layer, be the same from incremental layer to incremental layer or a combination thereof. In some embodiments, the size of the increment is the same for each incremental layer (build lap) of a build cycle, is different for one or more incremental layers of a build cycle, or a combination thereof.

The size of a vertical increment can be relative to a prior initial position of the build platform or the height adjuster of the powder fill head or both. For example, the platform is lowered within the cavity by a first increment to a first position relative to upper surface of the build module. A printed incremental layer is formed on the platform at the first position during a first build lap. The platform is then lowered by a second increment to a second position but relative to where it was at the first position. Another printed incremental layer is formed on the platform while at the second position during a second build lap. This process is repeated until completion of a build cycle.

The size of a vertical increment can be relative to one or more absolute positions of the platform in the cavity of a build module. For example, the build module can comprise plural encoders distributed vertically within or adjacent the cavity. The size of a first vertical increment, then, is defined by the absolute position (absolute vertical distance) of the platform with respect to a first encoder. When the platform is lowered by a second increment to a target second vertical position, which is determined according to or defined by the absolute vertical distance of the platform with respect to a second decoder. This type of absolute positioning can be exemplified as follows. If the target increment is 0.50 mm below the upper surface of a build module, the platform is commanded to drop 0.50 mm. If the next target increment is to be an additional 0.25 mm, then the platform is commanded to drop to a depth of 0.75 mm below the upper surface of the build module rather than to command it to drop by 0.25 mm relative to the initial 0.5 mm increment. This approach is generally superior to using relative moves (0.500, then 0.250) as any minor positioning errors will be resolved or at least not accumulate.

The build plate is adapted to fit within the upper cavity of a build module and to superpose a height adjustable platform within the cavity. The build plate receives and supports a powder bed and/or incremental powder layer(s). In some embodiments, the removable build plate is flat, porous, perforated, textured, coated, knurled, smooth or a combination thereof. Any regular and/or irregular geometric pattern for the arrangement of perforations can be used. The shape of the build plate can be varied as needed. FIG. 6 depicts build plates (40a-40h) shaped as a rectangle with rounded corners (40a), octagon (40b), cross (40c), circle (40d), hexagon (40e), pentagon (40f), half-rectangle/half-circle (40g, bullet-shaped profile), rectangle with one concave end and one convex end (40h); however, any other shape can be used. The porosity (extent of perforation) of a build plate can be adapted as need to improve operation and manufacture. The build plate (40a) comprises plural evenly spaced perforations. The build plate (40b) comprises a lattice-type structure or mesh. The build plate (40f) comprises a rough surface with plural perforations. The build plate (40g). A build plate can be made of any material durable enough to withstand three-dimensional printing thereon. In some embodiments, the build plate is adapted for single use or repeated use. In some embodiments, the build plate comprises pressboard, paperboard, cardboard, cardstock, metal, rubber, plastic, silicone, Teflon (PVDF), coated metal, vinyl, nylon, polyethylene, polypropylene, thermoplastic or a combination thereof.

The optional build plate loading system is adapted to reload build plates onto the build modules engaged with the conveyor. In some embodiments, the build plate loading system is adapted to place one or more build plates on the height adjustable platform(s) of the one or more build modules. The build plate loading system (9) depicted in FIGS. 7A and 7B comprises a horizontally-telescopic arm (41) pivotally engaged (43) with a vertically-telescopic post (42) and a tray-loading arm (44). The system (9) engages a build plate by a grasp comprised with the vertical tray loading arm (44). The exemplary grasp comprises a plate (46) and an actuatable member (45) that biases/presses a build plate against the plate thereby grasping and temporarily retaining the tray. Other grasps can be used to engage and temporarily retain the tray. In some embodiments, the build plate loading system is a vacuum-based transfer system. The build plate system can also be absent, in which case build plates can be loaded manually onto the build modules.

The powder-layering system (3) depicted in FIGS. 8A-8C is mounted on a support (table, frame, body, 54) and comprises at least one powder fill head (51), at least one powder reservoir (50) and at least one powder feeder tube (52) driven by a powder feeder drive (53) and adapted to transfer powder from the powder reservoir to the powder fill head. The powder feeder tube can comprise a drive motor and screw-type shaft, e.g. an auger or shaft with spiral blades/vanes, such as found in a Schenk feeder. The powder-layering system forms the incremental powder layer when a build module passes through the powder dispensing region (55, also referred to as a layering region), for example in the direction of Arrow J (FIG. 8C).

In some embodiments, a powder fill head (51) depicted in FIG. 9 comprises a powder fill head body (60, box), at least one powder fill head hopper (61) and at least one powder spreader (64). The hopper receives material from the powder feeder tube to form a temporary supply (63) of powder, which is optionally agitated by powder fill head agitator (62), which can be a powder fill head distribution plate instead. In some embodiments, the hopper (61) is replaced with a chute (not shown, or distribution plate) having a channeled interior surface that distributes powder evenly across the width of the surface and downward onto a build module. Powder exits the hopper (or chute which does not accumulate a substantial amount of powder) in the direction of Arrow K. In some embodiments, the powder fill head further comprises at least one powder-height controller adapted to control the relative distance between the powder spreader (64) and a surface (such as the build plate, the upper surface of the build module, the height adjustable platform, or a prior powder layer) below the powder spreader. An optional distribution bar (or plate, not shown) can be placed between the outlet of the fill head body and the powder spreader (roller). The distribution bar serves to better distribute powder across a layer of powder prior to being contacted by the powder spreader, whereby an incremental powder layer (65) is formed.

The powder-height controller can raise or lower the powder spreader so as increase or decrease the thickness of a layer of powder placed onto the platform or a prior layer of powder on the platform. For example, if the platform is lowered by a first increment and the powder-height controller is raised by the same or another second increment, then the thickness of powder laid down will approximate the sum of the first and second increments. If the platform is lowered by a first increment and the powder-height controller is lower by a second increment, then the thickness of powder laid down will approximate the difference of the first increment minus the second increment. Alternatively, the powder spreader in combination with the powder-height controller can cooperate to compress a layer of powder that has been previously laid down. This can be accomplished by first laying down a layer of powder having a first thickness during a first build lap, lowering the powder-height controller and powder spreader and then passing the layer of powder under the lowered powder spreader thereby compressing the layer of powder.

In some embodiments, the powder spreader is a cylindrical roller the axis of which has a radial direction of motion opposite the linear direction of motion of a build module through the powder layering system. For example, the surface of the cylinder (64) has a linear direction (Arrow M) opposite the direction (Arrow J) of which an underlying build module (10) passes under the cylinder. In some embodiments, the powder spreader is a cylindrical roller, bar, rod, plate or straight smooth edge. Powder fill heads of other construction can be used.

The amount or rate of powder discharged from the powder fill head can be regulated with one or more controls. A powder discharge feedback controller can monitor the accumulation of powder at the powder spreader as the powder is being discharged from the powder fill head and spread to form an incremental powder layer. If the rate at which powder is released is too fast, an excessive amount of powder will accumulate at the powder spreader possibly causing it to spread the powder improperly. The feedback controller then sends a signal thereby causing the rate of powder discharge from the powder fill head to decrease. Conversely, if the feedback controller senses that the rate of powder discharge is too slow, it sends a signal thereby causing the rate of powder discharge to increase. The feedback controller can employ one or more visual, laser, acoustic or mechanical sensors or a combination thereof.

FIGS. 2C-2D depict a portion of a modular (segmented) conveyor system (21) comprising plural conveyor modules (segments, links) (22) and corresponding engagement means (23) adapted to engage adjacent conveyor modules to each other. FIG. 2C is a front elevation view, and FIG. 2D is a top plan view. A conveyor module comprises a body (22a), female engagement means (22d), male engagement means (22c), and one or more build module engagement means (22b) adapted to removably or permanently engage build modules. In this exemplary embodiment, adjacent segments (22) pivotally engaged by means of engagement means (23) and pin (22e) such that the segments can pivot about the axis of the pin (22e) in the direction of Arrow LX. Although engagement means (23) is depicted as a hinge-type joint, other engagements can be used.

The equipment assembly (1) optionally comprises one or more powder recovery systems. The powder recovery system (11) depicted in FIG. 1 and FIG. 2E is optional and is a vacuum-based system comprising a body (11a), aspirator bar (11c), vacuum source (11b), and one or more air inlets (11d, 11e) adapted to remove powder from one or more surfaces of a build module. In some embodiments, the powder recovery system is adapted to remove loose powder from the upper surface of a build module. The powder recovery system (11) can comprise engagement (11f) by way of which it is removably or permanently engaged to a surface or support. Additional powder recovery systems are described herein.

FIGS. 3A-3C depict an exemplary printing system (4) adapted to apply liquid to a powder in the printing region of a printing system. FIG. 3A is a top plan view, FIG. 3B is a side elevation view and FIG. 3C is a front elevation view. In some embodiments, the liquid is applied according to a Cartesian coordinate system instead of a polar coordinate system (radial system, cylindrical coordinate system, circular coordinate system, or spherical coordinate system). In some embodiments, the invention excludes a printing system adapted to apply liquid to the powder according to a polar coordinate system. An exemplary printing system comprises at least one print head (28) that deposits liquid onto an incremental layer of powder in a build module and at least one liquid feed system (28b) that conducts liquid from one or more liquid reservoirs (28c) to the at least one print head (28). In some embodiments, the printing system comprises plural print heads, plural liquid feed systems, plural reservoirs or a combination thereof. In some embodiments, the printing system comprises a single print head, plural liquid feed systems, and plural reservoirs.

The print head of FIG. 3B directs a stream of droplets of liquid into a printing region (29) through which build modules pass. The exemplary system (4) comprises a frame or gantry (tracks 27a, 27b) by way of which the print head (28) can translate/move in the direction of Arrow D, which is transverse to the direction of motion of a build module during printing. Translation of the print head can be performed manually or via computer controlled operation. In some embodiments, the print head is stationary when applying liquid onto an incremental layer of powder, meaning that as liquid is being applied to a powder layer during a print lap, the print head (in particular the print modules) does not move in a direction which is transverse, with respect to the build plane, to the direction of motion of a build module during printing, i.e. during the application of liquid. Such a means of printing is different than prior systems wherein the print head (in particular the print module(s)) moves back and forth, in a direction which is transverse to the direction of motion of a build module, during printing.

A print head can comprise one or more print modules that deposit the liquid onto a layer of powder. The print head (28) of FIG. 3C comprises four print modules that form corresponding printing regions (29a-29d). When a print head comprises plural print modules, the arrangement/layout of the print modules can be as needed. The print head (30) of FIG. 4 comprises plural print modules (4) arranged in plural columns with each column comprising plural print modules. A powder can pass across the print modules in the direction of Arrow E such that print direction is transverse to the horizontal shape of the print module.

Other suitable arrangements for the print modules are depicted in FIG. 5. The print head (34) comprises a single print module. The print head (35) comprises four print modules pared in groups (35a, 35b) of two offset horizontally from one another. The print head (33) is somewhat similar to head (35) except that the print modules (35a, 35b) are wider horizontally and offset to a greater extent horizontally than are the print modules (33a); moreover, the print modules are horizontally offset from one another. The print head (32) comprises two linearly and transversely offset groups (32a, 32b) of print modules. When viewed in the direction of Arrow E, the adjacent edges of the two groups overlap (each group overlaps the dashed line).

By offsetting the print modules as depicted for module (33), the apparent overall print resolution of the print head can be increased. The print modules can be offset in staggered, interlaced, sobered, or angled arrangements relative to the print head in order to increase overall print density/resolution. For example, if the print resolution of each print module is 75 dpi (drops per inch), then the apparent overall print resolution of the print head (33) can be 75 dpi, 150 dpi, 225 dpi, 300 dpi, 375 dpi, 450 dpi or even higher. If the print resolution of each print modules is 100 dpi, then the apparent overall print resolution of the print head (33) can be 100 dpi, 200 dpi, 300 dpi, 400 dpi or even higher. In some embodiments, the print resolution of the print head is the same as or greater than the print resolution of a print module comprised within the print head. In some embodiments, the print resolution of the print head is a multiple of the print resolution of one or more print modules comprised within the print head. In some embodiments, the print resolution of the print head is the less than the print resolution of a print module comprised within the print head.

The arrangement of one or more print modules in the print head can be modified as needed to provide the desired printing result. FIG. 16 depicts a partial print station comprising a powder fill head (176) and a print head (178) below which is a build module (175) moving in the direction of Arrow Q through a powder dispensing region and a printing region, respectively. The fill head, which is disposed transverse to the direction of motion of the build module, remains transversely and longitudinally stationary (with respect to the plane defining the upper surface of the build module, even though it can move vertically toward or away from said plane) as it places an incremental layer of powder onto and across the width of a cavity of the build module. The build module and incremental layer of unprinted powder moves in the direction of Arrow Q, whereby they pass through the printing region beneath the print module, which is disposed transverse to the direction of motion of the build module. The print module remains transversely, longitudinally and vertically stationary with respect to the plane defining the upper surface of the build module. The print module applies liquid onto the incremental layer of powder according to a predetermined pattern, thereby forming an incremental printed layer (180) comprising article(s) 181. The exemplary print head comprises a single print module (179; depicted in dashed line) that spans the width of a cavity of the build module.

The print head (185) depicted in FIG. 17A comprises four print modules (186) arranged in both transverse and longitudinal displacement (with respect to the direction of motion of the print head). Together the four print modules span the width of the cavity of the build module. The embodiment (187) of FIG. 17B differs from that of FIG. 17A in that the four print modules (188) are only transversely displaced but not longitudinally displaced.

In some embodiments, the one or more print heads is/are stationary when applying liquid onto an incremental layer, i.e. when printing. The one or more print heads can, in particular, be transversely and longitudinally stationary, with respect to the linear direction of motion of a build module (and thus an incremental layer of powder), when printing. Particular embodiments include those wherein: a) the printing is performed according to a Cartesian coordinate algorithm; b) the build module moves during printing in a linear direction that is perpendicular to the disposition of the print module (and one or more print heads); c) the print head and one or more print modules are stationary when printing (when applying liquid to an incremental layer of powder) and do not move in a direction that is transverse or longitudinal with respect to the direction of motion of the build module; and/or d) printing is not performed solely according to a polar coordinate algorithm.

The three-dimensional printing system/assembly of the invention employs Cartesian coordinate based printing system and algorithms. Unlike other systems that move the print heads transversely and/or longitudinally when printing, the print heads of the invention are substantially stationary during printing. The term "transversely" is determined in relation to the direction of motion of a build module beneath a print head and means substantially perpendicular to the direction in which a build module is conducted through a printing area. The term "longitudinally" is determined in relation to the direction of motion of a build module beneath a print head and means substantially parallel to the direction in which a build module is conducted through a printing area. Application of liquid across the width of powder layer beneath a print head is accomplished by employing one or more print modules that individually or together traverse at least 75%, 80%, at least 85%, at least 90%, at least 95%, at least 97.5% or at least 99% the width of the powder layer.

In the present case, the "width" of the powder layer is determined along a direction transverse to the direction of motion of a build module beneath a print head, and the term "length" is determined along a direction parallel to the direction of motion of a build module beneath a print head. In other words, a single print head can traverse the width or plural print heads transversely adjacent to each other can traverse the width of the powder layer.

In particular embodiments, the print head comprises plural print modules that individually do not but together do span the width of an incremental powder layer and/or of the cavity of a build module. In some embodiments, one or more print modules together modules span at least 50%, at least 55%, at least 75%, at least 90%, at least 95%, at least 99% or all of the width of the cavity of the build module. In particular embodiments, the build module moves in a first direction, and the print head is stationary when liquid is being applied to the incremental powder layer. In particular embodiments, printing is performed primarily or solely according to a Cartesian coordinate algorithm. For example, the algorithm controls application of the droplets of the printing fluid relative to the linear (non-radial, straight) direction of the conveyor such that the print head applies droplets in a direction that is parallel (longitudinal) or is perpendicular (transverse) with respect to the linear direction of motion of the conveyor. The conveyor and corresponding build modules only move in a straight linear direction beneath the print head and build head.

An alternate embodiment of the invention is depicted in FIG. 17C, wherein the print head (189a) comprises one or more or plural print modules that do not span the width of an incremental powder layer and/or of the cavity of a build module. This print head is either stationary when printing (when applying liquid to an incremental layer of powder) or moves transversely, with respect to the direction of motion of the build module, while applying liquid to the powder. The print modules of the print heads (32, 33, 35, 189a, 189b of FIGS. 5 and 17C) are arranged such that the jets on multiple print heads are interleaved to increase the print density across the print bed. For example, individual print modules having a native print density of 100 dpi are interleaved together such that four of the print heads together provide a 400 dpi print density.

In some embodiments, clusters of print modules, such as depicted in 17D, are arranged so their overall span covers only part of the width of a powder layer, such that plural print heads (each containing a cluster of print modules with interleaved jets) are required to cover the full width of the powder layer. For example, three print heads (189b), each having a cluster of print modules which together spans only 2.5", would need to be arranged in a horizontally offset manner in order to cover the width of a powder bed or layer that is between 5 to 7.5 inches wide.

The at least one printing system can apply liquid according to any predetermined print pattern or randomly onto an incremental layer of powder. The pattern can be the same from incremental layer to incremental layer or can be different for one or more incremental layers of a printed article. Generally, two adjacent print patterns will comprise at least two overlapping printed portions such that at least a portion of the printed/bound powder in one printed incremental layer will adhere (be bound) to at least a portion of the printed/bound powder of an adjacent printed incremental layer. In this manner, plural stacked adjacent printed incremental layers adhere to each other thereby forming a three-dimensionally printed article comprising plural adjacent printed incremental layers of completely or partially bound powder. Even though a three-dimensionally printed article can include undercuts, overhangs, cavities, holes and other such features, at least part of the printed portions of adjacent printed incremental layers must adhere to one another in order to form and fill the composite volume of the article.

The printing system employs a Cartesian coordinate-based printing algorithm when applying liquid to an incremental powder layer. The system includes a computer and associated software that comprises one or more print jobs. A print job includes, among other things, information on the thickness of incremental layers and the predetermined pattern to be printed on the incremental layers of a printed article. The print job provides layer-by-layer instructions to the print head (print module(s)) about the creation and placement of droplets of liquid onto the incremental powder layer. The print job is based upon the series of two-dimensional images (slices) that, when stacked, together form a predetermined three-dimensional image (object).

Without being held bound to a particular mechanism, a target three-dimensional article is designed, such as with a CAD program. A virtual image of the target article is sliced virtually into plural stacked thinly-sliced images (which are referred to herein as "two-dimensional" images), wherein each two-dimensional image is actually the thickness of an incremental powder layer. The sum total of thicknesses of the image slices equals the total "height" of a target article. Each two-dimensional "image" is then converted into a subset of printing instructions, which together define a predetermined printing pattern for that image. All of the subsets of printing instructions are joined together to form a final set of printing instructions that are used by the computer to control printing. Aside from incremental layer thickness, two-dimensional shape of predetermined patterns, and shape of target article, the final set of print instructions also includes specification of or consideration of linear speed of the build module beneath the print head, rate of application of liquid to incremental powder layers, length and width of the incremental powder layer, dimensions of the cavity of a build module, incremental height adjustment of the height adjustable platform of the build module, rate of loading of powder into the powder fill head, rate of loading of powder into a build module to form an incremental layer, rate of transfer of powder from a feed reservoir to the fill head, resolution of the two dimensional image to be printed on each incremental layer, the number of applications of liquid to each incremental layer, application of one or more specific liquids to one or more specific locations of the incremental layer, starting and stopping of liquid application with respect to each build module, the number of articles to be printed, the number of build modules in the equipment assembly, the number of build modules to be printed upon, rate at which the platform of the build module moves down, timing for starting and stopping powder delivery relative to the entire build cycle, rotational speed of leveling device (roller) and other such parameters.

An equipment assembly comprises a control system comprising one or more controllers. Without being held bound to a particular mechanism, a homing switch located at a fixed point of the conveyor (FIG. 1) provides a reference point as to the location of the "first" build module in a group of build modules. From there, a computer is able to determine the location of the rest of the build modules in that group by knowing the size of the conveyor, the spacing of the build modules and the dimensions of the build modules. The control system can also comprise a proximity sensor that specifies the location of one or more build modules relative to the conveyor. The control system comprises a synchronizer that facilitates synchronization of operation of the various components of the equipment assembly. By taking into consideration the track (linear) speed of the conveyor and the target thickness and width of an incremental layer, a computer is able to instruct the powder layering system to charge powder onto the build modules at a certain feed rate. After part of a lap or after one or two calibration laps, the powder feed rate can be continuous. Once a proper incremental powder layer is formed, deposition of liquid onto the incremental layer can begin. A proximity sensor senses the leading edge of a build module and then sends instruction to the print system. A computer controlling the print system takes into consideration a set of printing instructions (which can include among other things the target print resolution (density), the image(s) (pattern(s)) to be printed on the incremental layer, the target rate of liquid deposition, the number of liquids to be deposited, the dimension of the print head and print modules, track speed, the set of images (patterns) that are to be printed to form a target 3D printed article, target article porosity or density, or other such parameters) and the signal generated by a wheel encoder, for example, to provide a pulse that sets the print rate at which to consume the image files in the printing instructions and the resolution at which to print the image file(s). Following completion of layering and printing per the printing instructions, a build cycle is completed.

As described herein, the powder system can comprise one or more feedback controllers that determine the proper powder feed rate into a powder feeder and into the build modules. Likewise, the printing system can comprise one or more feedback controllers that determine the rate at which printing fluid (liquid) is being applied and/or consumed and can therefore control the liquid application rate and can also the reloading of liquid reservoir(s).

A liquid removal system, such as a dryer, can comprise one or more relative humidity controllers, temperature controllers and conveyor speed controllers. The system is therefore capable of adjusting drying time and conditions to provide printed articles containing the desired level of moisture.

In some embodiments, one or more components of the equipment assembly are computer controlled. A controller is independently selected at each occurrence from a computerized controller, electronic controller, mechanical controller or a combination thereof. In some embodiments, the control system comprises one or more computerized controllers, one or more computers, one or more user interfaces for one or more computers. In some embodiments, one or more components of the three-dimensional printing build system are computer controlled. In some embodiments, the conveyor system, the height adjustable platforms of the build modules, the at least one powder layering system and the at least one printing system are computer controlled. In some embodiments, the equipment assembly is adapted to spread layers of powder and print droplets of liquid in a predetermined pattern according to instructions provided by a computerized controller. In some embodiments, the predetermined pattern is based on one or more two-dimensional image files comprising pixels. In some embodiments, the two-dimensional image files are structured such that certain pixels indicate dispensing of droplets, and other pixels represent no dispensing of droplets. In some embodiments, the two-dimensional image files include different colors of pixels to indicate dispensing of different liquids, or no dispensing of liquid.

Figure 19A:
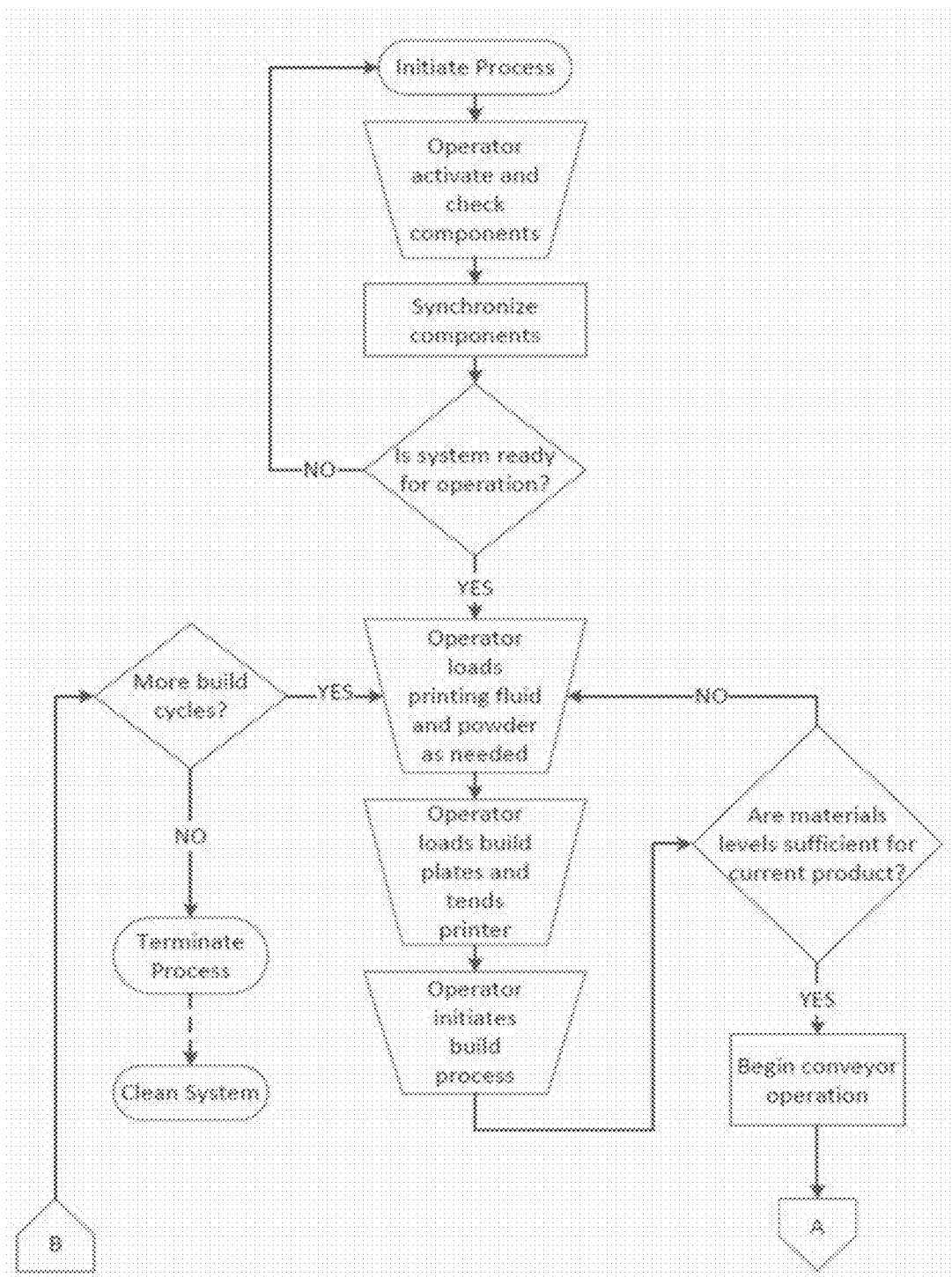
Figure 19B:
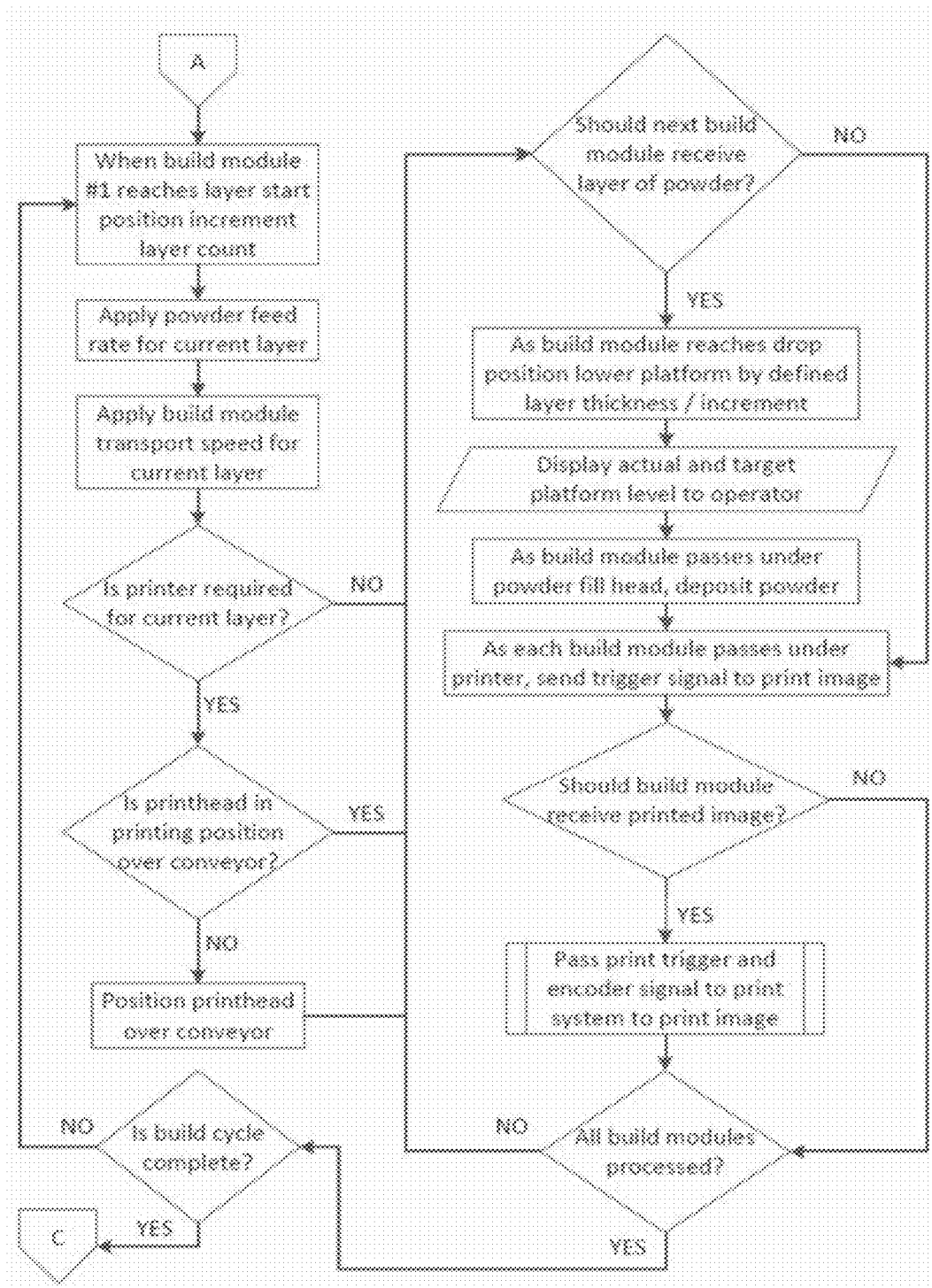

FIGS. 19A-19C, depict a flow chart for operation of an exemplary embodiment of the invention. The process is initiated, e.g. by an operator or electronic component such as a computer. An operator activates and checks the status of system and assembly components, which are then synchronized, after which time the system (assembly) is ready for operation. Printing fluid and powder are loaded into their respective systems as required of the product to be three-dimensionally printed. Build plates are loaded into build modules and a build cycle is initiated. The level of printing fluid(s) and powder(s) are checked and when the required amount is present, conveyor operation is initiated. Moving to FIG. 19B, the powder feed rate and transport speed (conveyor speed) for the build module is applied and a query is made to determine whether or not a build module is supposed to receive powder. If so, the platform is lowered and a layer of powder is deposited onto the build module as it passes under the powder fill head. If not, the build module does not receive powder. A query is then made to determine whether or not the powder layer is supposed to receive a printed image. If so, a two-dimensional pattern is printed onto the layer as the build module passes under the print head. If not, the build module does not receive printing solution. A query is made to determine whether or not all of the build modules mounted on the conveyor have been processed, i.e. whether or not the build lap is completed or whether or not the build module is supposed to receive another layer of powder. If not, any unprocessed build module is processed. If all of the build modules have been processed, i.e. the build lap is complete, a query is made to determine whether or not a build cycle is complete. If not, one or more additional build laps are conducted. If so, the build modules are prepared for unloading of build plates as described in FIG. 19C. Completed build plates that bear three-dimensionally printed powder bed are unloaded and transferred to drying trays. After a build plate has been removed from a build module, another build tray is placed in the empty build module. After all build plates have been unloaded, a query is made according to FIG. 19A to determine whether or not additional build cycles will be conducted. If not, the process is terminated. If so, the next build cycle process is initiated.

Figure 20:
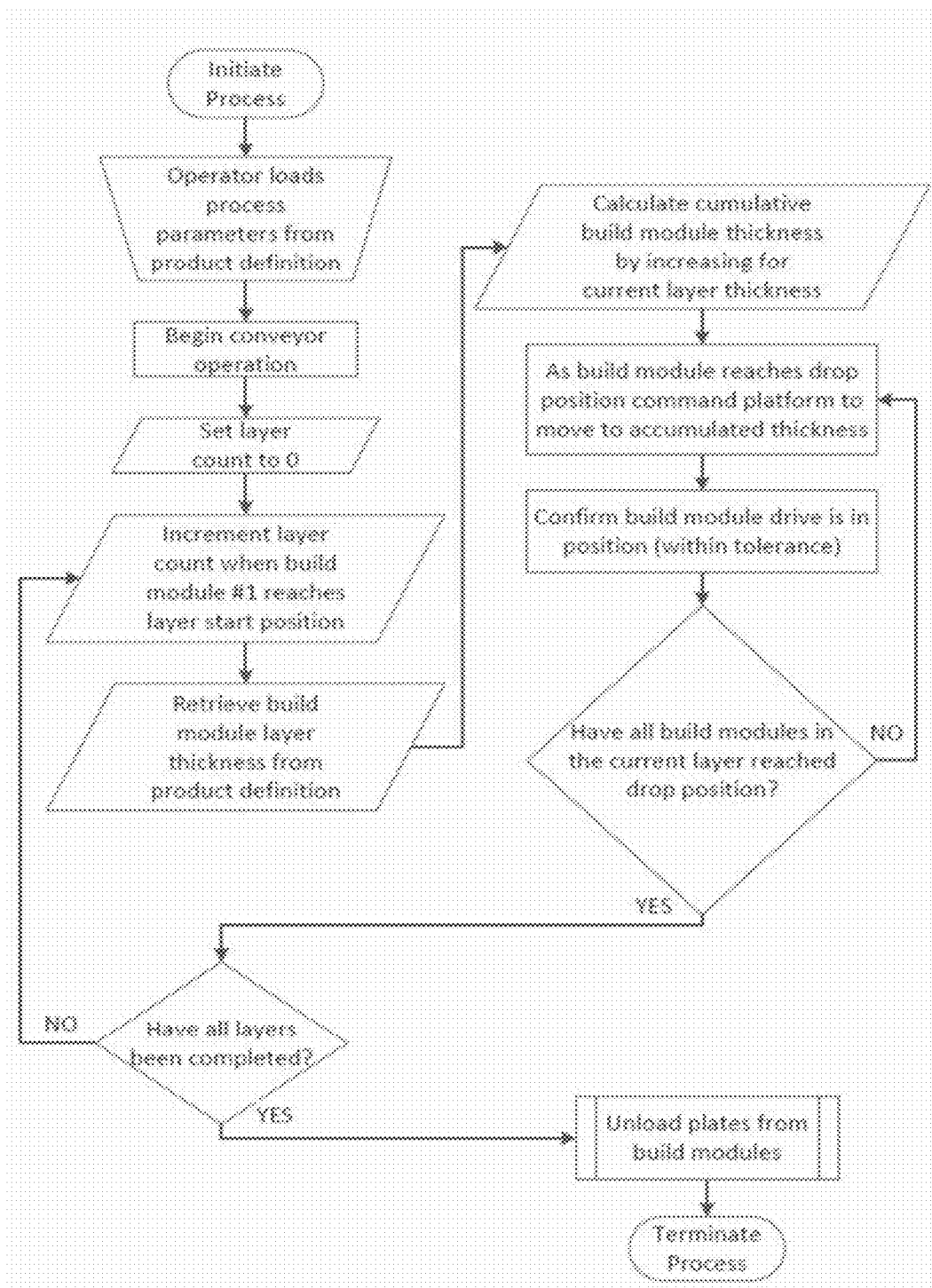
FIG. 20 depicts an exemplary logic flow for operation of the powder layering system.

FIG. 20 depicts an exemplary subroutine detailing how the platform layer increment is controlled within a build lap and a build cycle. In this example, the layer thickness (increment) is provided by a product definition. A cumulative thickness is calculated according to the number of powder layers already laid down. The platform is dropped to the calculated thickness and a determination is made to confirm that it is at the correct position within a predefined tolerance. A query is then made to determine whether or not the platform of all the build modules in a particular build lap have dropped to the correct position. If not, the platforms are adjusted as required. If so, a query is made to determine whether or not all layers of a build cycle are complete. If so, the build plates are unloaded as described herein. If not, the process of this figure is repeated for each of the build layers as needed until the build cycle is complete.

Figure 21:
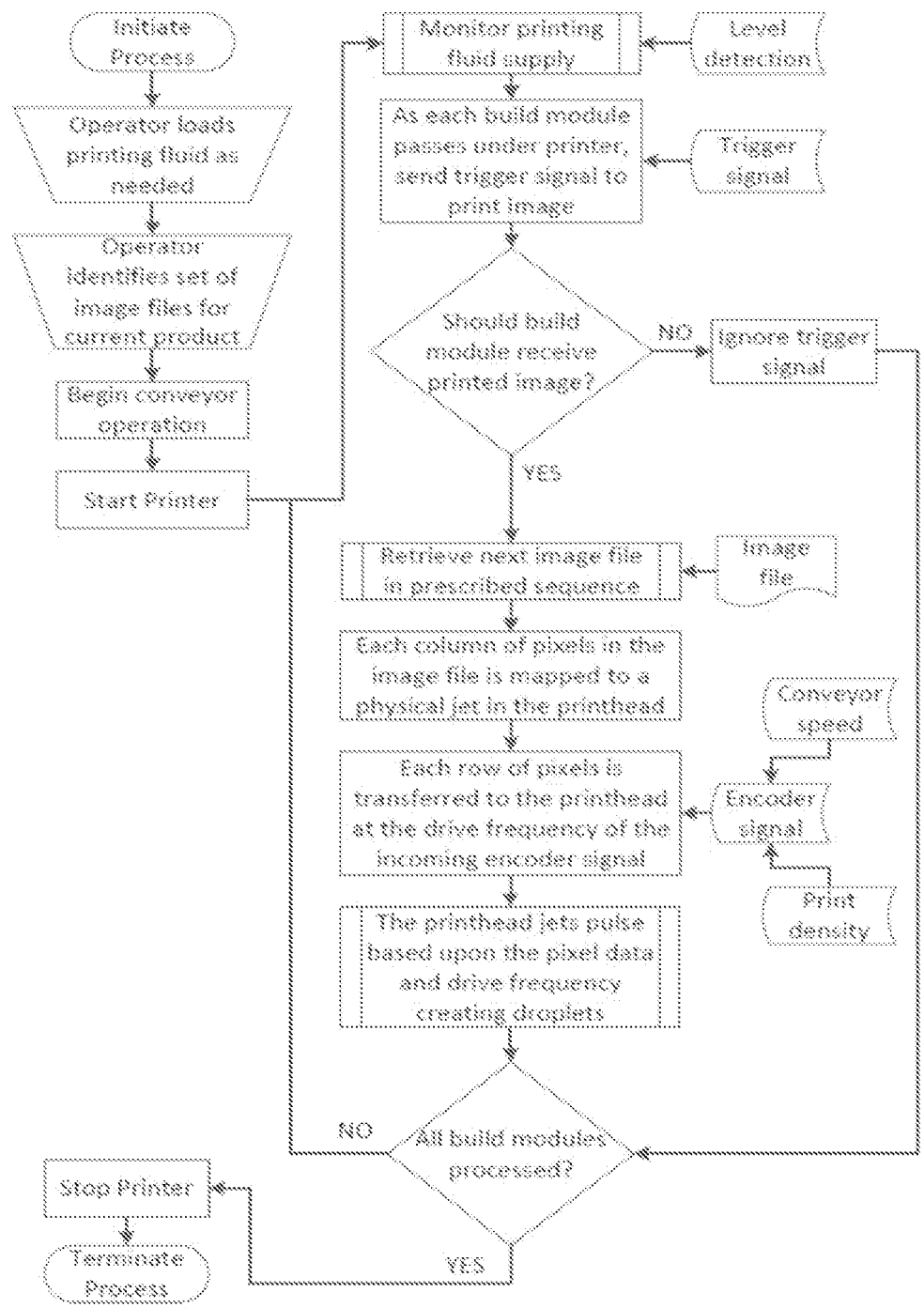
FIG. 21 depicts an exemplary logic flow for operation of the printing system.

FIG. 21 describes an exemplary subroutine detailing operation of the printing system. A build process is initiated and the necessary amount(s) of printing fluid is loaded into the reservoir(s). A set of image files are identified and conveyor operation is begun. During operation, the level of printing fluid(s) is monitored so that it can be replenished as needed. When a build module passes beneath a printhead, a trigger signal is generated prompting a query to determine whether or not the build module is to receive a printed image. If not, the trigger signal is ignored. If so, an print image file is received and processed such that the columns of image pixels (pixels that are aligned along the axis of movement of the build module) are assigned to specific jets of the printhead. In addition, rows of image pixels are sent to the printhead taking into consideration the linear speed of the conveyor and the intended print density of the image to be printed. The printhead then delivers printing fluid droplets, as per the printing instructions, to the powder layer on a build module. A query is then made to determine whether or not all build modules have been processed. This query can be repeated for the build lap and/or build cycle level. Upon completion of a build cycle, the process can be terminated. If needed, the printhead can be retracted and cleaned.

Figure 22:
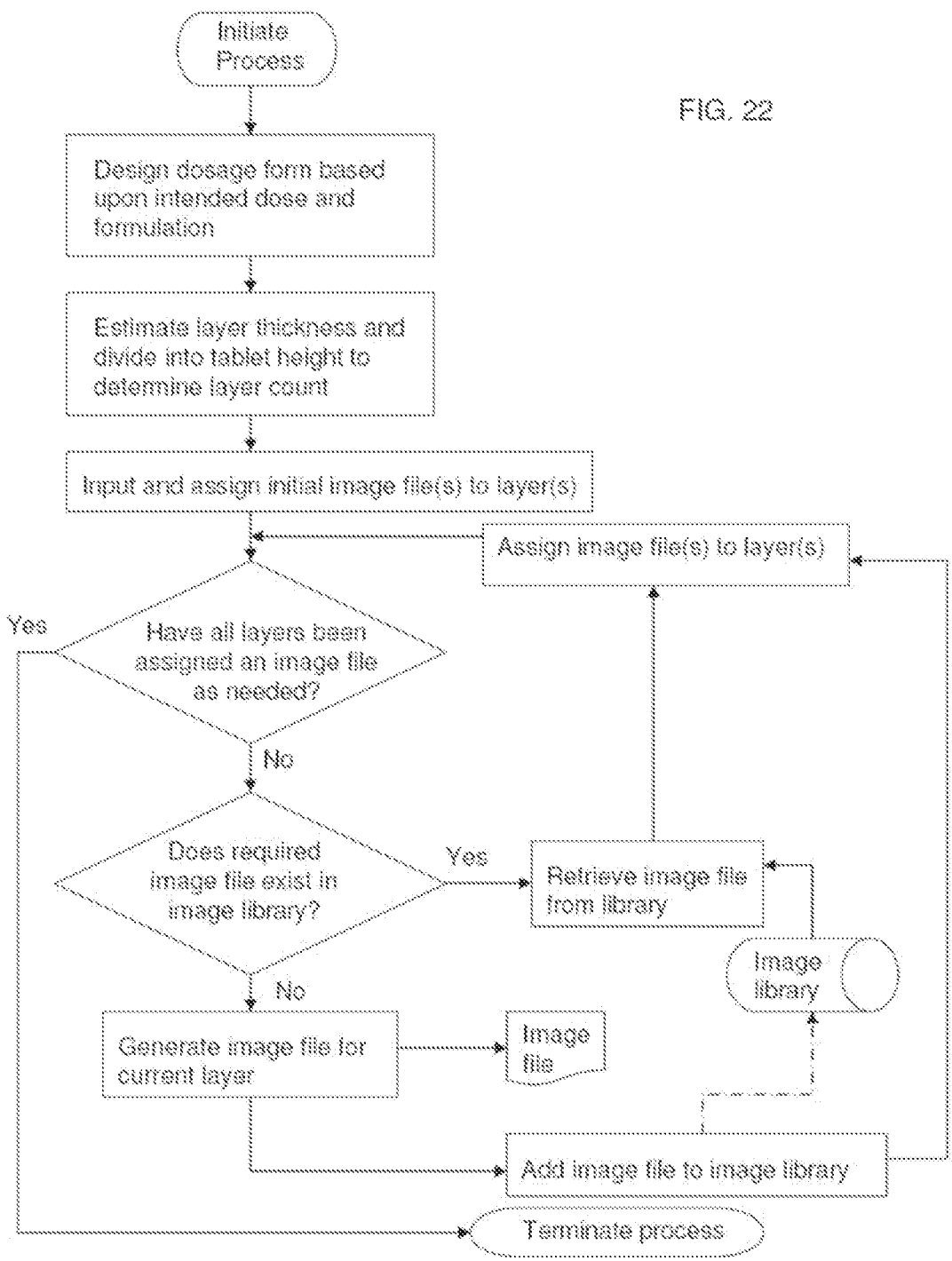
FIG. 22 depicts an exemplary logic flow for design of a dosage form.

FIG. 22 depicts a flow chart of an exemplary process for designing a dosage form and determining the layer thickness thereof and image files (two-dimensional printing patterns) there for. The process can be conducted with or without a computer. A dosage form having a specified three-dimensional structure and comprising a target dose of drug is designed. The approximate target powder layer thickness is selected and the height of the dosage form is divided by the target incremental powder layer thickness to provide the number of powder layers required to prepare the dosage form. Based upon the layer and its location within the dosage form, each layer is assigned as needed an initial two-dimensional pattern, i.e. an image file, which ultimately results in a set of printing instructions employed by the printing system to create a corresponding printed increment layer. The image file assigned to each layer can be input, or it can be retrieved from an image library. In order to determine whether or not archived images from the image library are required, the system queries whether or not all layers have been assigned an image file as needed. If so, the design of the dosage form is complete and the process is terminated. If not, the system queries whether or not the image required for a specific layer exists in the image library. If so, the image file is retrieved from the library and assigned to the respective powder layer. The system then again queries whether or not all layers have been assigned an image file as needed and the loop of logic continues as needed until completion of design of the dosage form. If the image file is not present in the image library, a new image file is created, optionally stored in the image library, and assigned to the respective layer, and the loop of logic continues as needed until completion of the dosage form design. It should be understood that one or more layers might not require any image file at all, meaning that specific layer would not be printed during preparation of the dosage form.

Figure 10B:
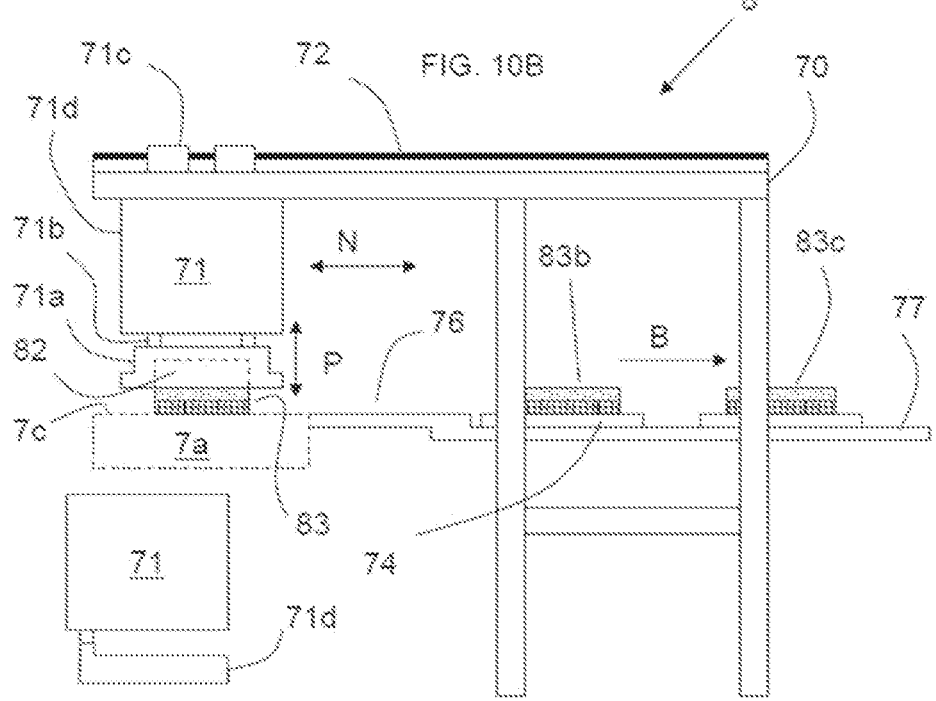
FIG. 10B depicts a side elevation view of the exemplary bed transfer system of FIG. 10A.

The equipment assembly of the invention can comprise one or more bed transfer systems adapted to transfer three-dimensionally printed beds, one or more at a time, away from the three-dimensional printing build system. FIG. 10A is a top plan view and FIG. 10B is a side elevation view of an exemplary bed transfer (unloading) system (8) comprising a frame (70), receiving platform (76), tray-loading platform (77), and bed transfer mechanism (71) moveably engaged with the frame and superposing a bed-transferring region (75). The bed transfer mechanism (71) comprises mounts (71c) adapted to translate along tracks (72a, 72b) in the direction of Arrow N in a reciprocating manner. The bed transfer mechanism also comprises a receptacle (71a) comprising a cavity (82) adapted to receive and temporarily retain a three-dimensionally printed bed (83) having an optional build plate (10). In an alternate embodiment, the receptacle is a push plate or U-shaped coral (71d) comprising a receiving area adapted to receive and temporarily retain a three-dimensionally printed bed. The receptacle (71a) reciprocates in a vertical manner in the direction of the Arrow P by means of reciprocator (71b) engaged with the receptacle (71a) and the body (71d) of the bed transfer mechanism (71). During operation, a conveyor conducts and positions a build module (7a) beneath the receptacle (71a) and in the bed-transferring region (75) so as to align the three-dimensionally printed bed (83) and build plate with the cavity (82). The receptacle then lowers in the direction of Arrow P an amount sufficient to retain substantially all of the three-dimensionally printed bed and build plate within the cavity. The bed transfer mechanism (71) then slides/translates the printed bed and build plate in the direction of the Arrow N onto the receiving platform (76) and then onto a transport tray (74). The receptacle is then raised in the direction of the Arrow P leaving the printed bed and build plate on the transport tray and translates back in the direction of Arrow N to the original position superposing a build module. The transport tray (74) is then conducted in the direction of the Arrow B.

Figure 10C:
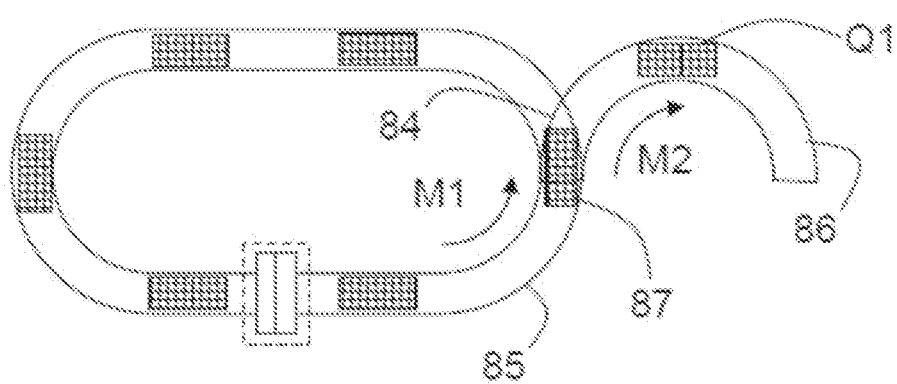
FIG. 10C depicts a partial top plan view of an alternated exemplary bed transfer system.

FIG. 10C depicts an alternate embodiment of a bed transfer system comprising a diverter (84) and a conveyor (86). The diverter directs build modules or build plates comprising printed beds (87) from the conveyor (85) of the build system onto an adjoining conveyor (86), which optionally transfers the printed beds to a liquid removal system or other downstream processing apparatus (not shown). The diverter can be adapted to raise and lower. In a first position, it does not direct printed beds away from the build system and in a second position it does.

In some embodiments, the bed transfer system is adapted to transfer three-dimensionally printed beds to one or more liquid removal systems, one or more harvesting systems and/or one or more packaging systems. In some embodiments, the transfer system is integrated with the conveyor system, the liquid removal system or both.

A liquid removal system is adapted to receive one or more build plates (containing a printed bed) and to remove liquid from one or more printed powder layers onto which the liquid has been applied and/or from the three-dimensionally printed bed. A liquid removal system can be a process area through which one or more of the build modules are conducted. For example, the liquid removal system in FIG. 1 can be the process area over the conveyor and excluding the region under the printing region. Alternatively, a liquid removal system can be another process area not directly associated with the three-dimensional printing build system, such as a temporary retaining or storage area wherein three-dimensionally printed beds are placed and dried under ambient conditions. In some embodiments, a liquid removal system is one or more dryers.

FIGS. 13A-13B depict exemplary liquid removal systems. FIG. 13A is a partial sectional side elevation view of a dryer (130) adapted to remove or reduce the amount of liquid in a three-dimensionally printed bed (83) or article. The dryer comprises a housing (131) within which are contained plural heating elements (137), a conveyor system (138) and one more exhaust ports (132). The housing comprises an inlet (133) and an outlet (134) through which three-dimensionally printed beds (or articles) and their respective build plates are conducted by way of conveyors (135, 136, respectively). During operation, the printed beds are conducted through the inlet (133) and carried by the conveyor system (138) through a predetermined path as they are exposed to the heating elements (137), which affect evaporation of liquid from the printed beds. When the printed beds (or articles) exit the dryer, they comprise less liquid than they did when they entered the dryer. Although not depicted in FIG. 13A, the dryer can comprise a vacuum system adapted to reduce the pressure within the dryer or air-handling system adapted to increase or otherwise control the flow of air through the dryer. Although the path of the conveyors is depicted as "S-shaped" in FIG. 13A, the path can instead be any path desired, e.g. U-shaped, Z-shaped, N-shaped, n-shaped, O-shaped, etc.

FIG. 13B depicts an alternate embodiment of a dryer (141) suitable as a liquid removal system. The dryer comprises a housing (142), within which are contained plural heating elements (146) and a conveyor system (145). The housing comprises an inlet (143) and an outlet (144) through which three-dimensionally printed beds and their respective build plates are conducted by way of the conveyor. In some embodiments, the dryer comprises one or more covers (147) for the inlet and/or outlet.

In some embodiments, the three-dimensionally printed bed comprises loose powder and one or more three-dimensionally printed articles. An equipment assembly of the invention can further comprise one or more harvesting systems adapted to separate loose powder from the one or more three-dimensionally printed articles. In some embodiments, the harvester processes build plates already processed by the liquid removal system. In some embodiments, the harvester comprises loose powder collection means and three-dimensionally printed article collection means. In some embodiments, the harvester comprises a vibrating and/or orbiting surface adapted to receive the three-dimensionally printed bed. In some embodiments, the harvester comprises one or more deagglomerators.

In some embodiments, the equipment assembly further comprises one or more dedusters adapted to remove loose powder from articles that have been harvested. In some embodiments, a deduster comprises one or more air brushes.

Figure 14:
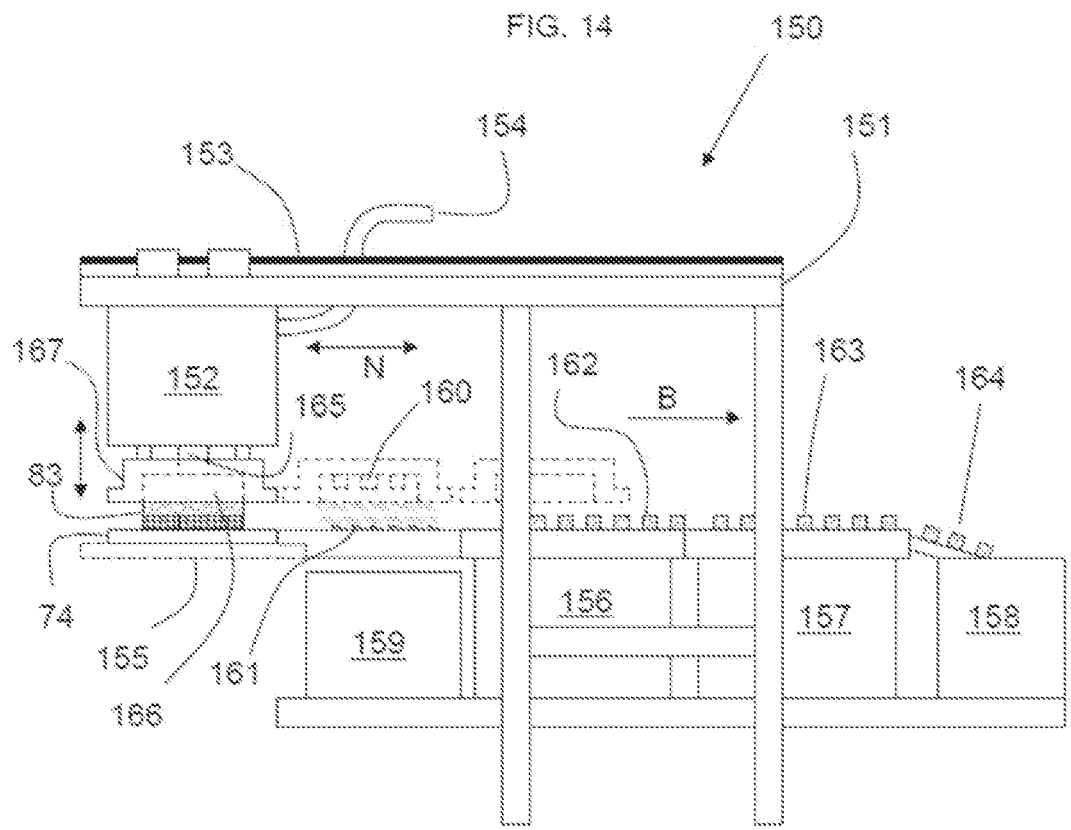
FIG. 14 depicts a side elevation view of an exemplary harvesting system of the invention.

The exemplary combination harvester and deduster system (150) depicted in side elevation view in FIG. 14 comprises a frame (151), a receiving platform having an air-dispenser (161), bed transfer mechanism (152) moveably engaged with the frame and superposing a bed transfer region, aspirator (154), deagglomerator (156), deduster (157), printed article collector (158), and powder collector (159). The also comprises at least one air brush (161). The bed transfer mechanism (152) comprises mounts adapted to translate along tracks (153) in the direction of Arrow N in a reciprocating manner. The bed transfer mechanism also comprises a receptacle (167) comprising a cavity (166) adapted to receive and temporarily retain a three-dimensionally printed bed (83) having an optional build plate (10). The receptacle (167) reciprocates in a vertical manner by means of reciprocator engaged with the receptacle and the body of the bed transfer mechanism (152). During operation, a conveyor (155) conducts and positions a printed bed (83), build plate (10) and transport tray (74) beneath the receptacle (167) and in a bed transfer region so as to align the three-dimensionally printed bed, build plate and transport tray with the cavity (166). The receptacle then lowers onto the transport tray an amount sufficient to retain substantially all of the three-dimensionally printed bed within the cavity. An aspirator (154) then aspirates the printed bed (83) by way of a conduit (165) and a perforated plate in the cavity and above the bed, thereby removing a major portion of the loose powder contained within the bed while leaving behind one or more printed articles (160) within the cavity of the receptacle. The bed transfer mechanism (152) then slides/translates the printed bed and build plate in the direction of the Arrow N over one or more airbrushes (161) adapted to direct a flow of air at the printed articles in the cavity to assist in releasing additional loose powder from the printed article(s). The empty build plate (10) and transport tray (74) are conveyed away from the bed-transferring region. A powder collector (159) is adapted to receive loose powder and other solid material not otherwise collected by the aspirator (154). The bed transfer mechanism continues to move in the direction of the Arrow B until it superposes a deagglomerator (156). The aspirator is then turned off and the printed particles fall onto of the process tray of the deagglomerator, which is adapted to remove and collect agglomerates from the printed article(s) to provide deagglomerated printed articles (162). The bed transfer mechanism (152) then returns to its original position in preparation of loading and processing of additional printed beds.

The process tray of the deagglomerator vibrates (and/or orbits) and conducts the printed articles in the direction of Arrow B toward the deduster (157) while degglomerating the printed particles. The deduster also comprises a vibrating process tray adapted to remove and collect dust from the deagglomerated printed articles to provide dedusted printed articles (163). The finished printed articles (164) are conducted to a printed article collector (158). The deduster and/or deagglomerator can further comprise solids collector for collecting loose powder and/or agglomerates.

FIG. 18 depicts an exemplary harvester system (190) and a deduster system (200). The harvester system comprises a housing (191), a receptacle (192), a vibrating surface (193) within the receptacle and an outlet (194) for the receptacle. A perforated build plate below a dry printed bed (loose powder and printed article) is placed on the vibrating surface. Loose powder is dislodged from the printed bed as the surface vibrates. The recovered loose powder falls and is collected in the receptacle, after which it is unloaded from the receptacle through the outlet. The recovered loose powder is collected in a container (195). Collection of the loose powder can be done manually, mechanically and/or with a vacuum system.

The deduster system (200) of FIG. 18 comprises a housing (201), receptacle (202), drawer (203), enclosure (204), one or more air jets, e.g. air knives, (205, not depicted) within the enclosure, inlet (206, not depicted) for the enclosure, and an outlet (207) for the enclosure. A perforated build tray having one or more printed articles that have been harvested is placed in the drawer which is subsequently pushed into the enclosure by way of the inlet, thereby forming a substantially enclosed dedusting area. One or more air jets direct pressurized air toward the printed article(s), whereby both coarse and fine loose powder that has clung onto the printed article(s) is dislodged there from. The loose powder falls into the receptacle and is conducted to the outlet along with the flow of air released by the air jet(s). The dedusted printed article(s) is (are) are retrieved by opening of the drawer. The recovered loose powder collected in a container. Collection of the loose powder can be done manually, mechanically and/or with a vacuum system and/or air-handling system. The deduster system and/or the harvester system can be placed within a larger enclosure (208) to minimize spreading of dust in a process area.

Loose powder, agglomerates or particulates collected during the build cycle, drying, harvesting, deagglomerating and/or dedusting can be disposed or can be blended to form recovered bulk material that can be milled (optionally) and recycled back into a feed supply of virgin unprinted bulk material. Such a bulk material recovery system can comprise one or more vacuum systems, one or more pressurized air systems, one or more non-vacuum mechanical systems, one or more manual systems or a combination thereof for transferring bulk material from one location to another.

FIGS. 12A-12E depict exemplary generalized layouts for conveyor systems and build stations of a three-dimensional printing build system. FIG. 12A depicts a top plan view of a three-dimensional printing build system (105) somewhat similar to the one depicted in FIG. 1. The system (105) comprises a cyclic and iterative conveyor system (110), a first build station (111), an optional second build station (115), and plural build modules. The plural build modules are conducted through the first build station, and optionally the second build station if present, and then back through the first build station in the direction of the Arrow A. The build station (111) comprises a powder-layering system (112) and a printing system (114).

FIG. 12B depicts a top plan view of a three-dimensional printing build system (106) comprising a linear conveyor system (118), a first build station (111), a second build station (115), and plural build modules. The plural build modules are conducted from position X1 through the first build station to position X2 and then through the second build station to position X3 in the direction of Arrow A. Further processing of printed articles is done downstream of the build system (106). In some embodiments, the conveyor system is a linear conveyor system that conducts build modules from a first build station to a second build station and optionally to a third or other build station in a non-cyclic or non-iterative manner.

FIG. 12C depicts a top plan view of a linear and iterative three-dimensional printing build system (107) comprising a linear conveyor system (119), a first build station (111), an optional second build station (115), and plural build modules. The plural build modules are conducted from position X1 through the first build station to position X2 and then through the second build station, if present, to position X3 and then, in reverse direction in the direction of Arrow AR, back through the second build station, if present, and the first build station. A third or more other build stations can be included, and if present, the build modules are conducted through them.

FIG. 12D depicts a top plan view of a linear and iterative three-dimensional printing build system (108) comprising plural build stations (111, 115, 126, 127), plural build modules, and build module transfer means (124, 125). Empty build modules on a conveyor (120) are transported from position Z1 to position X1. The conveyor (121) then conducts build modules consecutively from positions X1 to X2 to X3 and through the build stations (111, 115). Build module transfer means (124) then transfer build modules in the direction of Arrow AZ from position X3 to position X4. A second conveyor then conducts build modules consecutively from positions X4 to X5 to X6 and through the build stations (126, 127, respectively). Build module transfer means (125) then transfer build modules in the direction of Arrow AY from position X6 to position X1. This type of build lap is repeated as many times as necessary until the desired printed article is formed and unloaded from the printing build system (108) by way of the conveyor (122).

FIG. 12E depicts a side elevation view of a three-dimensional printing build system (109) somewhat similar to that of FIG. 12D. In this embodiment, however, the conveyors (128, 129) are arranged vertically one above the other rather than side by side. Moreover, the lower conveyor system (129) does not have a build station specifically associated with it.

As noted above, it takes plural build laps to construct a three-dimensionally printed article from a powder bed. FIG. 11A depicts a partial cross-sectional view of a build module (90) comprising a body (91) having an upper surface (91a) and a height adjustable platform (92) having an upper surface (92a). The hollow arrows indicate process steps, whereas the filled-in black arrows indicate direction of motion of the platform in the figure. The build module (90) is depicted in starting position at Stage 0. In process steps A1 and A2, the platform is lowered thereby forming a cavity (93) defined by the inner surface (91b) of the build module and the upper surface of the platform. A build plate (10) is then placed on top of the platform as depicted in Stage I. In process step B1, a layer of powder (94) is placed in the cavity and over the build plate such that the position of upper surface (94a) of the layer substantially matches (or is at the same height of) the position of the upper surface (91a) of the build module as depicted in Stage II. In process step C1, platform is lowered again by an increment thereby forming a new cavity (95) above the surface of the powder layer (94) as depicted in Stage III. In process steps D1 and D2, another layer of powder is placed in the cavity and then printed upon to form one or more sections of bound powder as depicted in Stage IV. In process step E1, the platform is lowered again and another cavity is formed above the previous layer of powder as depicted in Stage V. In process steps F1 and F2, another layer of powder is placed in the cavity and then printed upon to form one or more sections of bound powder as depicted in Stage VI. The print pattern used in process step D2 is similar to the print pattern used in process step F2. In process step G1, the platform is lowered again as depicted in Stage VII. In-process step H1, a layer of powder is placed in the just formed cavity over the prior layer of powder as depicted in Stage VIII thereby completing formation of a printed bed comprising loose powder (97) and plural printed articles (96). In process step J1, the receptacle (71a) of a bed transfer means is placed above the printed bed such that the cavity of the receptacle superposes and is aligned with the printed bed as depicted in Stage IX. In process step K1, the platform is raised such that the build plate and printed bed are disposed within the cavity as depicted in Stage X. In process step L1, the receptacle is translated/slid in the direction of Arrow N thereby unloading the builds tray returning it to Stage 0.

The print pattern used for individual print cycles can vary as needed and need not be the same for each build lap. FIG. 11B depicts the build module of the FIG. 11A. The process steps A1, A2, B1 and C1 in FIG. 11B are similar to those steps in FIG. 11A; however, the process of FIG. 11B includes the process step B2 whereby the first layer of powder is printed upon to form a layer comprising loose powder (100) and bound powder (101). In process step D1, a layer of powder is placed within the cavity, and in process step D3, the layer is printed upon using a print pattern that is different than the print pattern used in process step B2 such that the cross-section of the bound powder (102) in Stage IV of FIG. 11B is different than the cross-section of the bound powder in Stage IV of FIG. 11A. The pattern of step D3, however, overlaps with the pattern of step B2 sufficiently that the resulting printed layers adhere to one another. The platform is lowered again according to process step E1. Powder is then layered into the cavity in process step F1 and printed upon in process step F3. Again, the print pattern used in process step F3 is different than the print pattern used in process steps D3 and B2, such that the cross-section of the bound powder (103) in stage VI comprises three different patterns, which patterns are different than those depicted in stage VI of FIG. 11A. The pattern of step F3, however, overlaps with the pattern of step D3 sufficiently that the resulting printed layers adhere to one another. The platform is lowered again according to process step G1 as depicted in stage VII. In process step H1, a layer of powder is placed within the cavity, and in process step H2, the layer is printed upon using a print pattern that is different than any of the prior print patterns used such that the cross-section of the bound powder (104) in the printed bed in stage VIII comprises six different patterns, which patterns are different than those depicted in stage VIII of FIG. 11A. The pattern of step H2, however, overlaps with the pattern of step F3 sufficiently that the resulting printed layers adhere to one another. In process step J1, a perforated plate is placed above the printed bed and a receptacle of a bed transport means is placed above the plate as depicted in Stage X. In process step K1, the perforated plate, printed bed and build plate are raised into the cavity of the receptacle. In process step L1, the receptacle is translated away in the direction of Arrow N leaving behind the build module in its initial stage 0.

Upon completion of the exemplary print cycle, the three-dimensionally printed bed can be further processed as described herein.

Conveyor systems useful for conducting solid articles from one location to another during manufacture include, by way of example, a modular conveyor, non-modular conveyor, continuous conveyor, contiguous conveyor, conveyor belt, cam, pallet conveyor or link conveyor. Combinations thereof can be used.

Figure 15:
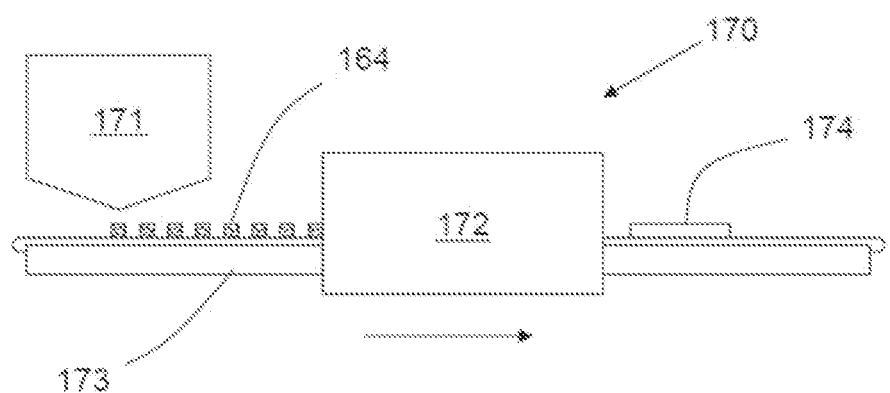
FIG. 15 depicts a side elevation view of an exemplary packaging system of the invention.

FIG. 15 depicts a side elevation view of an exemplary packaging system (170) adapted to package one or more three-dimensionally printed articles (164). The system comprises a hopper (171) that provides three-dimensionally printed articles which are placed onto a conveyor (173). The articles are conducted through a packaging module (172) that places one or more articles into a package (174). Suitable packaging systems can employs bottles, blister packs, tubes, boxes and other such containers.

The various components and systems of the equipment assembly will comprise parts made of durable materials such as metal, plastic, rubber or a combination thereof. In some embodiments, components of the equipment assembly comprise 304 or 316 stainless steel where possible.

The powder can comprise one or more materials suitable for pharmaceutical or non-pharmaceutical use. In some embodiments, the powder comprises one or more pharmaceutical excipients, one or more pharmaceutically active agents, or a combination thereof. In some embodiments, the three-dimensionally printed article is a pharmaceutical dosage form, medical device, medical implant, or other such article as described.

Exemplary types of pharmaceutical excipients that can be included in a three-dimensionally printed article include, by way of example and without limitation, chelating agent, preservative, adsorbent, acidifying agent, alkalizing agent, antifoaming agent, buffering agent, colorant, electrolyte, flavorant, polishing agent, salt, stabilizer, sweetening agent, tonicity modifier, antiadherent, binder, diluent, direct compression excipient, disintegrant, glidant, lubricant, opaquant, polishing agent, plasticizer, other pharmaceutical excipient, or a combination thereof.

Exemplary types of non-pharmaceutical excipients that can be included in a three-dimensionally printed article include, by way of example and without limitation, ash, clay, ceramic, metal, polymer, biological material, plastic, inorganic material, salt, other such materials or a combination thereof.

In some embodiments, the powder comprises one or more, two or more, three or more, four or more, five or more, six or more, seven or more, eight or more, nine or more, ten or more or plural components, each component being independently selected at each occurrence. In some embodiments, the equipment assembly comprises one or more, two or more, three or more, four or more, five or more, six or more, seven or more, eight or more, nine or more, ten or more or plural powder (or solid component) reservoirs.

Pharmaceutically active agents generally include physiologically or pharmacologically active substances that produce a systemic or localized effect or effects in animals, cells, non-humans and humans. When an active agent is present, any such agent can be used. Exemplary classes of active agents include, by way of example and without limitation, pesticides, herbicides, insecticides, antioxidants, plant growth instigators, sterilization agents, catalysts, chemical reagents, food products, nutrients, cosmetics, vitamins, sterility inhibitors, fertility instigators, microorganisms, flavoring agents, sweeteners, cleansing agents and other such compounds for pharmaceutical, veterinary, horticultural, household, food, culinary, agricultural, cosmetic, industrial, cleaning, confectionery and flavoring applications.

Whenever mentioned and unless otherwise specified, the term "active agent" includes all forms of the active agent including neutral, ionic, salt, basic, acidic, natural, synthetic, diastereomeric, isomeric, enantiomerically pure, racemic, hydrate, chelate, derivative, analog, optically active, optically enriched, free base, free acid, regioisomeric, amorphous, anhydrous and/or crystalline forms.

A three-dimensionally printed dosage form can comprise one, two or more different active agents. Particular combinations of active agents can be provided. Some combinations of active agents include: 1) a first drug from a first therapeutic class and a different second drug from the same therapeutic class; 2) a first drug from a first therapeutic class and a different second drug from a different therapeutic class; 3) a first drug having a first type of biological activity and a different second drug having about the same biological activity; 4) a first drug having a first type of biological activity and a different second drug having a different second type of biological activity. Exemplary combinations of active agents are described herein.

The active agent can be independently selected at each occurrence from active agents such as an antibiotic agent, antihistamine agent, decongestant, anti-inflammatory agent, antiparasitic agent, antiviral agent, local anesthetic, antifungal agent, amoebicidal agent, trichomonocidal agent, analgesic agent, anti-arthritic agent, anti-asthmatic agent, anticoagulant agent, anticonvulsant agent, antidepressant agent, antidiabetic agent, antineoplastic agent, anti-psychotic agent, neuroleptic agent, antihypertensive agent, hypnotic agent, sedative agent, anxiolytic energizer agent, antiparkinson agent, muscle relaxant agent, antimalarial agent, hormonal agent, contraceptive agent, sympathomimetic agent, hypoglycemic agent, antilipemic agent, ophthalmic agent, electrolytic agent, diagnostic agent, prokinetic agent, gastric acid secretion inhibitor agent, anti-ulcerant agent, anti-flatulent agent, anti-incontinence agent, cardiovascular agent or a combination thereof. A description of these and other classes of useful drugs and a listing of species within each class can be found in Martindale, The Extra Pharmacopoeia, 31ST Ed. (The Pharmaceutical Press, London 1996), the disclosure of which is incorporated herein by reference in its entirety.

The above-mentioned lists should not be considered exhaustive and are merely exemplary of the many embodiments considered within the scope of the invention. Many other active agents can be included in the powder of the invention.

The liquid applied to the powder can be a solution or suspension. The liquid can comprise an aqueous carrier, nonaqueous carrier, organic carrier or a combination thereof. The aqueous carrier can be water or an aqueous buffer. The nonaqueous carrier can be an organic solvent, low molecular weight polymer, oil, silicone, other suitable material, alcohol, ethanol, methanol, propanol, isopropanol, poly(ethylene glycol), glycol, other such materials or a combination thereof.

In some embodiments, the equipment assembly comprises one or more, two or more, three or more, four or more or plural liquid reservoirs. The liquid can be colored or non-colored. The liquid can comprise pigment, paint, dye, tint, ink or a combination thereof.

The liquid can comprise one or more solutes dissolved therein. The powder and/or liquid can comprise one or more binders.

The exemplary embodiments herein should not be considered exhaustive, but merely illustrative of only a few of the many embodiments contemplated by the present invention.

As used herein, the term "about" is taken to mean a value that is within .+−0.10%, .+−0.5% or .+−0.1% of the indicated value.

The entire disclosures of all documents cited herein are hereby incorporated by reference in their entirety.

Example 1

The following materials and procedure are used to prepare three-dimensionally printed dosage forms that dissolve rapidly in saliva.

A powder comprising at least one pharmaceutical carrier is loaded into the powder reservoir. A fluid comprising a liquid and at least one active ingredient is loaded into the fluid reservoir. The equipment assembly is operated, whereby plural stacked incremental layers of printed powder are sequentially formed in build modules by repeatedly passing the build modules through one or more build stations. Typically four to fifty incremental printed powder layers are formed and adhere to each other thereby forming a printed bed having one or more articles surrounded by or embedded in loose powder. The printed beds are dried in a dryer. The printed articles are separated from the loose powder with a harvester. The printed articles are then optionally dedusted with a deduster. The printed articles are then optionally packaged.

The above is a detailed description of particular embodiments of the invention. It will be appreciated that, although specific embodiments of the invention have been described herein for purposes of illustration, various modifications may be made without departing from the spirit and scope of the invention. Accordingly, the invention is not limited except as by the appended claims. All of the embodiments disclosed and claimed herein can be made and executed without undue experimentation in light of the present disclosure.

Because the instant application is a continuation application, to the extent any amendments, characterizations, or other assertions previously made (in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

What is claimed is:

1. A three-dimensional printing equipment assembly comprising:
   a) a three-dimensional printing build system comprising:
   a conveyor system adapted to conduct plural build modules; plural build modules engaged with the conveyor system, wherein the plural build modules are adapted to receive and temporarily retain powder from a powder layering system; and at least one build station comprising: 1) at least one powder layering system adapted to form incremental powder layers within at least one of the build modules; and 2) at least one printing system adapted to apply a liquid according to a predetermined pattern to incremental powder layers within the at least one of the build modules;
   wherein the conveyor system repeatedly transports the plural build modules from the at least one powder layering system to the at least one printing system to form a three-dimensionally printed bed comprising one or more three-dimensionally printed articles in the plural build modules; and the equipment assembly excludes a printing system adapted to apply liquid to the incremental powder layers according to a polar coordinate algorithm.

2. The three-dimensional printing equipment assembly according to claim 1, further including one or more harvesting systems adapted to separate loose powder from the one or more three-dimensionally printed articles.

3. The three-dimensional printing equipment assembly according to claim 2, further including a loose powder collector and a three-dimensionally printed article collector.

4. The three-dimensional printing equipment assembly according to claim 3, wherein the one or more harvesting system comprises at least one of a vibrating or orbiting surface adapted to receive the three-dimensionally printed powder bed or the one or more three-dimensionally printed articles, and a vacuum conveyor with a screen to separate the one or more three-dimensionally printed articles from the loose powder.

5. The three-dimensional printing equipment assembly according to claim 2, further including a dedusting system adapted to remove loose particles from the one or more three dimensionally printed articles that have been harvested from the three-dimensionally printed bed.

6. The three-dimensional printing equipment assembly according to claim 2, further including a liquid removal system comprising at least one dryer, adapted to process two or more three dimensionally printed articles at a time.

* * * * *

UNITED STATES PATENT AND TRADEMARK OFFICE
CERTIFICATE OF CORRECTION

| | |
|---|---|
| PATENT NO. | : 11,597,150 B2 |
| APPLICATION NO. | : 17/407911 |
| DATED | : March 7, 2023 |
| INVENTOR(S) | : Jaedeok Yoo et al. |

It is certified that error appears in the above-identified patent and that said Letters Patent is hereby corrected as shown below:

On the Title Page

Page 2, under (63) Related U.S. Application Data, after the last listed application "PCT/US2013/057466, filed on Aug. 30, 2013" insert --said application No. 15/422,969 is a continuation of application No. 14/501,716--.

Signed and Sealed this
Eleventh Day of July, 2023

Katherine Kelly Vidal
*Director of the United States Patent and Trademark Office*